(12) United States Patent
LaBelle et al.

(10) Patent No.: US 10,948,366 B2
(45) Date of Patent: Mar. 16, 2021

(54) FLEXIBLE SENSORS INCORPORATING PIEZORESISTIVE COMPOSITE MATERIALS AND FABRICATION METHODS

(71) Applicants: Jeffrey LaBelle, Tempe, AZ (US); Steven Lathers, Littleton, CO (US)

(72) Inventors: Jeffrey LaBelle, Tempe, AZ (US); Steven Lathers, Littleton, CO (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 16/339,340

(22) PCT Filed: Oct. 4, 2017

(86) PCT No.: PCT/US2017/055020
§ 371 (c)(1),
(2) Date: Apr. 3, 2019

(87) PCT Pub. No.: WO2018/067626
PCT Pub. Date: Apr. 12, 2018

(65) Prior Publication Data
US 2019/0234816 A1     Aug. 1, 2019

Related U.S. Application Data

(60) Provisional application No. 62/404,137, filed on Oct. 4, 2016.

(51) Int. Cl.
*G01L 1/00* (2006.01)
*G01L 1/18* (2006.01)
(Continued)

(52) U.S. Cl.
CPC .............. *G01L 1/18* (2013.01); *B33Y 80/00* (2014.12); *H01B 1/24* (2013.01); *H01B 13/0016* (2013.01);
(Continued)

(58) Field of Classification Search
CPC ........... G01L 1/18; B33Y 80/00; B33Y 10/00; B33Y 30/00; H01B 1/24; H01B 13/0016;
(Continued)

(56) References Cited

U.S. PATENT DOCUMENTS 5,911,738 A * 6/1999 Sikorski ............. A61N 1/36542
216/2
6,109,737 A * 8/2000 Kishima .............. B41J 2/14233
347/70
(Continued)

FOREIGN PATENT DOCUMENTS

WO    2010111484 A1    9/2010
WO    2012009322 A1    1/2012
(Continued)

OTHER PUBLICATIONS

Author Uknown, "Limb Loss Statistics," Oct. 2015, Amputee Coalition, www.amputee-coalition.org/limb-loss-resource-center/resources-by-topic/limb-loss-statistics/limb-loss-statistics/#1, 2 pages.
(Continued)

*Primary Examiner* — Max H Noori
(74) *Attorney, Agent, or Firm* — Withrow & Terranova, P.L.L.C.

(57) ABSTRACT

A flexible sensor includes a first electrode, a second electrode, and a piezoresistive element incorporating piezoresistive composite material arranged between the first electrode and the second electrode. Piezoresistive composite materials include a thermoplastic elastomer (TPE) and a conductive filler material (e.g., carbon), may have an elastic
(Continued)

modulus value of preferably less than about 1×10⁻³ GPa, and exhibit a change in electrical resistance responsive to a change in pressure applied thereto. Exemplary flexible sensors may have a thickness and a feel similar to human skin, may be amenable to simple fabrication techniques (e.g., fused filament fabrication (FFF) three-dimensional (3D) printing or molding), and can be manufactured into user-specific geometries.

15 Claims, 32 Drawing Sheets

(51) Int. Cl.
| | |
|---|---|
| B33Y 80/00 | (2015.01) |
| H01B 1/24 | (2006.01) |
| H01B 13/00 | (2006.01) |
| B33Y 10/00 | (2015.01) |
| B33Y 30/00 | (2015.01) |
| B29C 64/118 | (2017.01) |
| B29K 9/06 | (2006.01) |
| B29K 507/04 | (2006.01) |
| B29L 31/34 | (2006.01) |
| B29L 31/00 | (2006.01) |

(52) U.S. Cl.
CPC ......... *B29C 64/118* (2017.08); *B29K 2009/06* (2013.01); *B29K 2507/045* (2013.01); *B29K 2995/0005* (2013.01); *B29L 2031/34* (2013.01); *B29L 2031/7532* (2013.01); *B33Y 10/00* (2014.12); *B33Y 30/00* (2014.12)

(58) Field of Classification Search
CPC .............. B29C 64/118; B29K 2009/06; B29K 2507/045; B29K 2995/0005; B29L 2031/34; B29L 2031/7532
USPC .................................................... 73/862.627
See application file for complete search history.

(56) References Cited

U.S. PATENT DOCUMENTS

| | | | |
|---|---|---|---|
| 7,067,293 | B2 | 6/2006 | LaBelle et al. |
| 8,815,178 | B2 | 8/2014 | Bishop et al. |
| 9,532,747 | B2 | 1/2017 | LaBelle et al. |
| 9,904,393 | B2* | 2/2018 | Frey ..................... G06F 3/0414 |
| 9,909,942 | B2 | 3/2018 | LaBelle et al. |
| 10,219,918 | B2 | 3/2019 | LaBelle et al. |
| 10,323,008 | B2 | 6/2019 | LaBelle et al. |
| 10,386,321 | B2 | 8/2019 | LaBelle et al. |
| 2007/0186689 | A1* | 8/2007 | Fukuda .................. G01L 9/008 73/862.68 |
| 2012/0312102 | A1 | 12/2012 | Alvarez et al. |
| 2013/0082970 | A1 | 4/2013 | Frey et al. |
| 2013/0183243 | A1 | 7/2013 | LaBelle et al. |
| 2014/0045028 | A1* | 2/2014 | Moon ................. H01M 10/613 429/120 |
| 2015/0057513 | A1 | 2/2015 | LaBelle et al. |
| 2015/0130325 | A1* | 5/2015 | Suenaga ............. H01L 41/0477 310/334 |
| 2015/0268108 | A1 | 9/2015 | LaBelle et al. |
| 2015/0327668 | A1 | 11/2015 | Bloch et al. |
| 2016/0008206 | A1 | 1/2016 | Devanaboyina |
| 2016/0068678 | A1 | 3/2016 | Luo et al. |
| 2017/0202691 | A1 | 7/2017 | LaBelle et al. |
| 2017/0205362 | A1 | 7/2017 | LaBelle |
| 2018/0049897 | A1 | 2/2018 | Lathers et al. |
| 2018/0095029 | A1 | 4/2018 | LaBelle |
| 2018/0266900 | A1* | 9/2018 | Kim ..................... D03D 1/0088 |
| 2019/0024131 | A1 | 1/2019 | LaBelle et al. |
| 2019/0046092 | A1 | 2/2019 | LaBelle et al. |
| 2019/0054277 | A1 | 2/2019 | LaBelle et al. |
| 2019/0150815 | A1 | 5/2019 | LaBelle et al. |
| 2019/0160206 | A1 | 5/2019 | Lathers et al. |
| 2019/0180074 | A1* | 6/2019 | Ding ..................... G06K 9/0004 |
| 2019/0328315 | A1 | 10/2019 | LaBelle et al. |
| 2019/0330163 | A1 | 10/2019 | LaBelle et al. |
| 2019/0369042 | A1 | 12/2019 | LaBelle et al. |
| 2020/0011778 | A1 | 1/2020 | Honikel et al. |
| 2020/0064297 | A1 | 2/2020 | Probst et al. |

FOREIGN PATENT DOCUMENTS

| | | |
|---|---|---|
| WO | 2013172929 A1 | 11/2013 |
| WO | 2014022586 A1 | 2/2014 |
| WO | 2014052470 A1 | 4/2014 |
| WO | 2015183893 A1 | 12/2015 |
| WO | 2015188107 A1 | 12/2015 |
| WO | 2016014572 A1 | 1/2016 |
| WO | 2016014895 A1 | 1/2016 |
| WO | 2016025153 A1 | 2/2016 |
| WO | 2016133706 A1 | 8/2016 |
| WO | 2017132565 A1 | 8/2017 |
| WO | 2017147041 A1 | 8/2017 |
| WO | 2018148236 A1 | 8/2018 |
| WO | 2018175448 A1 | 9/2018 |
| WO | 2018208610 A1 | 11/2018 |
| WO | 2019147978 A1 | 8/2019 |
| WO | 2019178588 A1 | 9/2019 |

OTHER PUBLICATIONS

Schwartz, Gregor, et al., "Flexible polymer transistors with high pressure sensitivity for application in electronic skin and health monitoring," Nature Communications, May 2013, Macmillan Publishers Limited, 8 pages.

Shao, Qi, et al., "High-Performance and Tailorable Pressure Sensor Based on Ultrathing Conductive Polymer Film," Small, vol. 10, Issue 8, 2014, pp. 1466-1472.

Zhu, Bowen, et al., "Microstructured Graphene Arrays for Highly Sensitive Flexible Tactile Sensors." Small, 2014, pp. 3625-3631.

International Search Report for International Patent Application No. PCT/US2017/055020, dated Dec. 7, 2017, 10 pages.

International Preliminary Report on Patentability for International Patent Application No. PCT/US2017/055020, dated Apr. 18, 2019, 9 pages.

U.S. Appl. No. 16/612,270, Green et al., filed Ap. 6, 2018.

U.S. Appl. No. 16/700,621, Smith et al., filed Dec. 2, 2019.

U.S. Appl. No. 16/806,418, LaBelle et al., filed Mar. 2, 2020.

Lathers, S. et al., "Advanced Manufactured Fused Filament Fabrication 3D Printed Osseointegrated Prosthesis for a Transhumeral Amputation Using Taulman 680 FDA," 3D Printing and Additive Manufacturing, 2016, Mary Ann Liebert, Inc., 9 pages.

\* cited by examiner

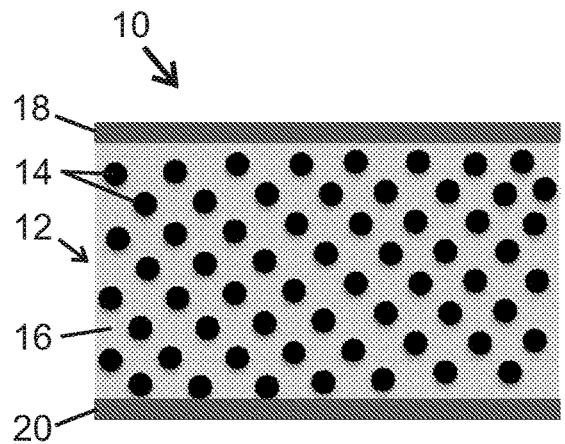
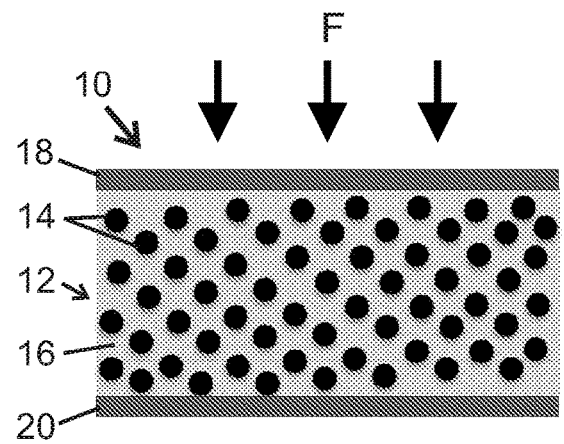
FIG. 1A
FIG. 1B
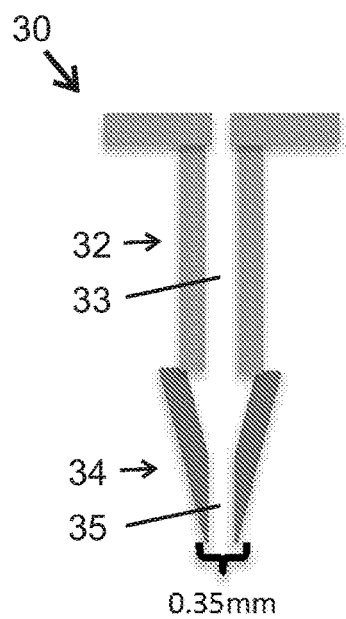
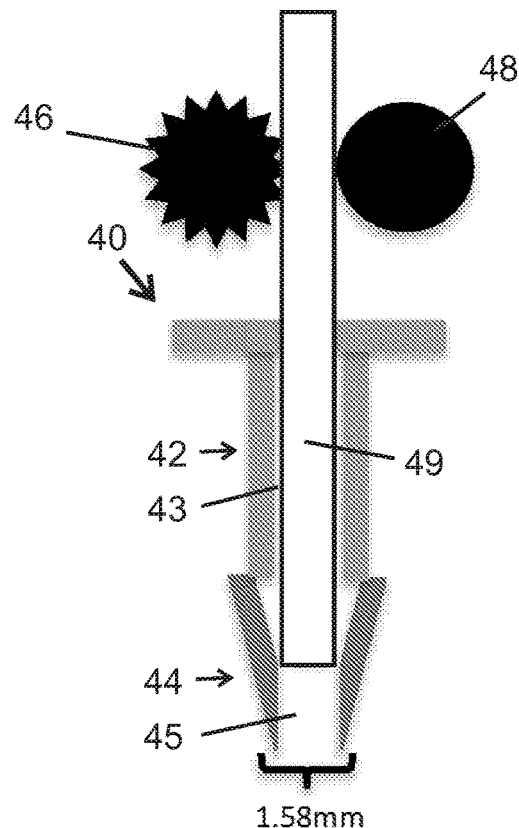
FIG. 2
FIG. 3

| FFF 3D Printer Settings ||
|---|---|
| Extruder Nozzle Temperature | 250°C |
| Bed Temperature | 100°C with Kapton tape |
| Layer Height | 0.6mm |
| Extruder Speed | 100mm/minute |
| Extruder Nozzle Diameter | 1.58mm |
| Extrusion Multiplier | 0.9 |
| Extrusion Width | 1.9mm |
| Layer Settings | 7 shells with 3 on top and 2 on bottom |

*FIG. 17*

| Sensor Type | Minimum Mass (Grams) | Maximum Mass (Grams) | Minimum Pressure (kPa) | Maximum Pressure (kPa) |
|---|---|---|---|---|
| Printed 1 to 1 | 50 | 750 | 3.4063 | 51.0938 |
| Molded 1 to 1 | 30 | 700 | 2.0438 | 47.6875 |
| Printed 1.33 to 1 | 5 | 300 | 0.3406 | 20.4375 |
| Molded 1.33 to 1 | 5 | 300 | 0.3406 | 20.4375 |
| Molded 1.66 to 1 | 0.25 | 300 | 0.0170 | 20.4375 |
| Molded 2 to 1 | 0.25 | 300 | 0.0170 | 20.4375 |

*FIG. 18*

FLEXIBLE SENSORS INCORPORATING PIEZORESISTIVE COMPOSITE MATERIALS AND FABRICATION METHODS

STATEMENT OF RELATED APPLICATION(S)

This application is a 35 U.S.C. 371 national phase filing of International Patent Application No. PCT/US2017/055020, filed Oct. 4, 2017, which claims the benefit of U.S. Provisional Patent Application No. 62/404,137 filed Oct. 4, 2016, wherein the contents of the foregoing applications are hereby incorporated by reference herein in their entireties.

TECHNICAL FIELD

This disclosure relates to flexible sensors, such as pressure sensors, proprioceptors, and shear sensors, that are suitable for use as tactile sensors in prosthetic feedback systems and/or medical devices, as well as methods for fabricating such sensors.

BACKGROUND

In the United States, about two million people have lost a limb, and about 185,000 people each year lose a limb, with hospital costs for amputations reaching approximately $8.3 billion each year. Approximately 54% of limb losses are attributable to vascular diseases, including diabetes and peripheral arterial disease; about 45% of limb losses are attributable to physical trauma; and fewer than 2% of limb losses are attributable to cancer, with a ratio of upper limb to lower limb loss of 1:4. Prosthetics can cost up to $50,000 per limb, with a significant fraction of cost frequently not covered by insurance. Additionally, many prosthetics need to be replaced as the user grows, and health insurance often does not cover the cost of continual replacement.

Some of the main feedback systems used in prosthetics include tactile (touch) sensors that relay to the user when the prosthetic has come into contact with an object. Tactile sensors are typically composed of either a pressure or shear sensor, and in certain situations contain both types of sensors. A pressure sensor detects forces acting perpendicular to its loading surface, whereas a shear sensor detects forces acting parallel to its loading surface. Other types of sensors useful with prosthetics and medical devices include proprioceptors, which provide information about joint angle, muscle length, and muscle tension, which may be integrated to give information about the position of a limb in space. Proprioceptors in the human body are specialized sensory receptors on nerve endings found in muscles, tendons, joints, and the inner ear.

Upper limb prosthetic pressure sensors are typically placed on the hand of the prosthetic due to the role they play in manipulating objects and daily activities. Sensor types include capacitive, piezo-resistive/electric, inductive, opto-electric, and strain gage based. The main design types used for current prosthetics are strain gage sensors for detecting pressure or shear.

Strain gage sensors provide a large operating range that can detect very high or low-pressure values, but are bulky and expensive. This may result in the prosthetic fingers being too large, which decreases the fine motor grasping function of the prosthetic. Bulky strain gage sensors also do not allow a sensing mechanism to be placed or wrapped around the edges or tip of the finger. Being able to sense on the edges and tip of the finger can greatly improve the fine motor control of a prosthetic.

To overcome the barriers of strain gage sensors, academic research has developed many different types and styles of pressure sensors in the form of film, most commonly referred to as thick or thin film sensors. These thick/thin film sensors are mostly piezo-resistive/electric based sensors, but can be transistor-based, capacitance-based, or optical-based, and can achieve high and low force detection. Thin/thick film sensors may also be used for shear force detection.

In research, film-based sensors have been shown to reach very low-pressure values, down to 0.001 Pa, and high-pressure values of up to 200 kPa. These pressure values are well within the human skin threshold for pressure detection, where the human skin is able to detect between 100 Pa-1 MPa, and the pressure required for common daily tasks is approximately 10 kPa.

Thick/thin film sensors include a top and bottom flexible layer, an inner conductive layer, and a top and bottom electrode surface for signal recording. The end sensor designs are bendable, but have a hard or smooth plastic finish that makes them difficult to be implemented on a prosthetic and does not create a finish or feel like human skin.

One conventional film sensor design includes a micropillar array-based pressure sensor with the active pressure sensing area comprised of a PPy/PDMS substrate and an Au covered micropillar array. Pillars of the micropillar array may have a repeating cell unit of 70.0 µm×120.0 µm with the diameter of the pillars varying from 5 µm to 65 µm. A second conventional film sensor design includes a microstructured rGO/PDMS film and ITO-coated PET film created through the use of silicon mold masters produced via photolithography. Elastomer precursor may be applied to the molds to create a base layer, with a layer-by-layer fabrication method used to add layers of uniform microstructure graphene to the elastomer surface. A third conventional (thin) film sensor design includes two layers laminated together, wherein the bottom layer contains a source-drain electrode and a semi-conducting polymer and the top layer contains a gate electrode and a microstructure dielectric. These examples of thick/thin film fabrication demonstrate the complexity of conventional film sensor manufacturing processes. Although thick/thin film sensors are well-suited to detect typical pressures encountered in daily human activities as well as pressures consistent with a light touch on human skin, these sensors require complicated manufacturing processes and are expensive. Additionally, these sensors do not embody an appearance similar to human skin, and are difficult to implement in or with a prosthetic.

Thus, strain gage sensors and thick/thin film based sensors have their respective benefits, but have limited utility with respect to their size, feel, and manufacturing techniques. As stated previously, strain gage sensors are bulky and expensive, whereas thick/thin film sensors lack the feel or appearance of synthetic human skin, entail complicated manufacturing processes and high costs, and are difficulty to implement in or with a prosthetic.

SUMMARY

Provided herein are flexible sensors incorporating piezoresistive elements arranged between first and second electrodes. A piezoresistive element includes a conductive filler material dispersed in a thermoplastic elastomer, wherein deformation of the thermoplastic elastomer (e.g., by compression, bending, shear, etc.) alters the spacing between conductive filler particles, thereby altering electrical resistance between the first and second electrodes. In certain embodiments, a constant voltage may be applied between the first and second electrodes, and current may be detected as a basis to determine resistance according to Ohm's Law.

In one aspect, a flexible sensor provided herein includes a first electrode, a second electrode, and a piezoresistive element comprising piezoresistive composite material arranged between the first electrode and the second electrode. The piezoresistive composite material includes a thermoplastic elastomer (TPE) and a conductive filler material, and further comprises an elastic modulus value of less than about $1 \times 10^{-3}$ GPa (optionally in a range of from $1 \times 10^{-5}$ to $9.9 \times 10^{-4}$ GPa).

In certain embodiments, flexible sensors disclosed herein may be embodied in pressure sensors, proprioceptors, or shear sensors. In certain embodiments, flexible sensors disclosed herein may be incorporated in prosthetic feedback systems and utilized for daily human activities. In certain embodiments, flexible sensors disclosed herein may be incorporated in medical devices.

In certain embodiments, the flexible sensor exhibits a change in electrical resistance of at least about $1 \times 10^2$ Ohms responsive to a change in pressure of $2 \times 10^4$ Pa applied to the piezoresistive composite material.

In certain embodiments, the TPE comprises polystyrene ethylene butylene styrene (SEBS). In certain embodiments, the flexible sensor may have a thickness in a range of from about 1 mm to about 3 mm.

In certain embodiments, the conductive filler material comprises carbon, such as at least one of graphite, carbon black, graphene, or diamond. In certain embodiments, the conductive filler material comprises an electrically conductive polymer having a higher melting temperature than the TPE. In certain embodiments, the conductive filler material is dispersed in the TPE.

In certain embodiments, at least one of the first electrode or the second electrode comprises a metal. In certain embodiments, at least one of the first electrode or the second electrode comprises a foil, a mesh, a grid, or a wire.

In certain embodiments, the piezoresistive element comprises a unitary fused body structure. The piezoresistive element may be fabricated by a three-dimensional printing ("3D printing") process, such as thermoplastic Fused Filament Fabrication (FFF). A 3D printed sensor may be easily fabricated in custom sizes and shapes to create individualized layouts or patterns for prosthetic or medical device sensor feedback systems that may be tailored to individual users or patients (i.e., manufactured to user-specific geometries).

In certain embodiments, the piezoresistive element comprises a molded body structure. The piezoresistive element may be formed via a molding process to yield the molded body structure. In certain embodiments, a mold useful for forming a piezoresistive element of a sensor disclosed herein may be produced by 3D printing to create prosthetic or medical device sensor feedback systems that may be individualized (tailored) to specific users or patients.

In certain embodiments, a prosthetic device or a medical device incorporates the flexible sensor as disclosed herein.

In another aspect, a method of fabricating a flexible sensor as disclosed herein includes multiple steps. One step includes forming a mixture of TPE and conductive filler material. Another step includes heating the mixture of TPE and conductive filler material to a flowable state. A further step includes shaping the heated mixture to form the piezoresistive element.

In certain embodiments, the shaping of the heated mixture includes selectively depositing the heated mixture in sequential layers, such as may be performed via 3D printing (including, but not limited to, use of a fused filament fabrication process).

In certain embodiments, the mixture of TPE and conductive filler material is formed into a rod-like structure having a first width or diameter, and the fused filament fabrication process comprises passing the rod-like structure through a heated structure including a discharge nozzle comprising a second width or diameter, wherein the first width or diameter is less than about 15% larger than the second width or diameter. By providing a discharge nozzle with a width or diameter that is significantly larger than normal, a low backpressure discharge condition is obtained, and mechanical properties of the piezoresistive composite material are improved.

In certain embodiments, selective deposition of the heated mixture in sequential layers is performed over one of the first electrode or the second electrode.

In certain embodiments, the method further includes forming at least one of the first electrode or the second electrode via three-dimensional printing.

In certain embodiments, the shaping of the heated mixture includes supplying the heated mixture of TPE and conductive filler material to a mold, and effectuating removal of the piezoresistive element from the mold.

In certain embodiments, a piezoresistive element may be pre-fabricated. In certain embodiments, the method further comprises applying at least one of the first electrode or the second electrode to the piezoresistive element.

In certain embodiments, the forming of the mixture of TPE and conductive filler material comprises applying a solvent to a thermoplastic block polymer to yield a flowable product, dispersing the conductive filler material in the flowable product, and evaporating the solvent from the flowable product. In certain embodiments, a mixture is obtained, and the mixture may be heated and subsequently cooled to form a shaped piezoresistive element.

In another aspect, any one or more aspects or features described herein may be combined with any one or more other aspects or features for additional advantage.

BRIEF DESCRIPTION OF THE DRAWINGS

FIG. 1A is a cross-sectional view of a flexible sensor incorporating a piezoresistive composite material arranged between a first electrode and a second electrode in a first, uncompressed state.

FIG. 1B is a cross-sectional view of the flexible sensor of FIG. 1A in a second, compressed state.

FIG. 2 is a side cross-sectional view of a heater tube/nozzle assembly of a conventional fused filament fabrication apparatus.

FIG. 3 is a side cross-sectional view of a modified heater tube/nozzle assembly useful for producing a piezoeresistive element as disclosed herein via fused filament fabrication.

FIG. 17 is a table including settings for a fused filament fabrication 3D printer used for producing a piezoresistive element as disclosed herein.

FIG. 18 is a table including minimum and maximum mass values as well as minimum and maximum pressure values for six flexible sensors disclosed herein.

DETAILED DESCRIPTION

Figure 4A:
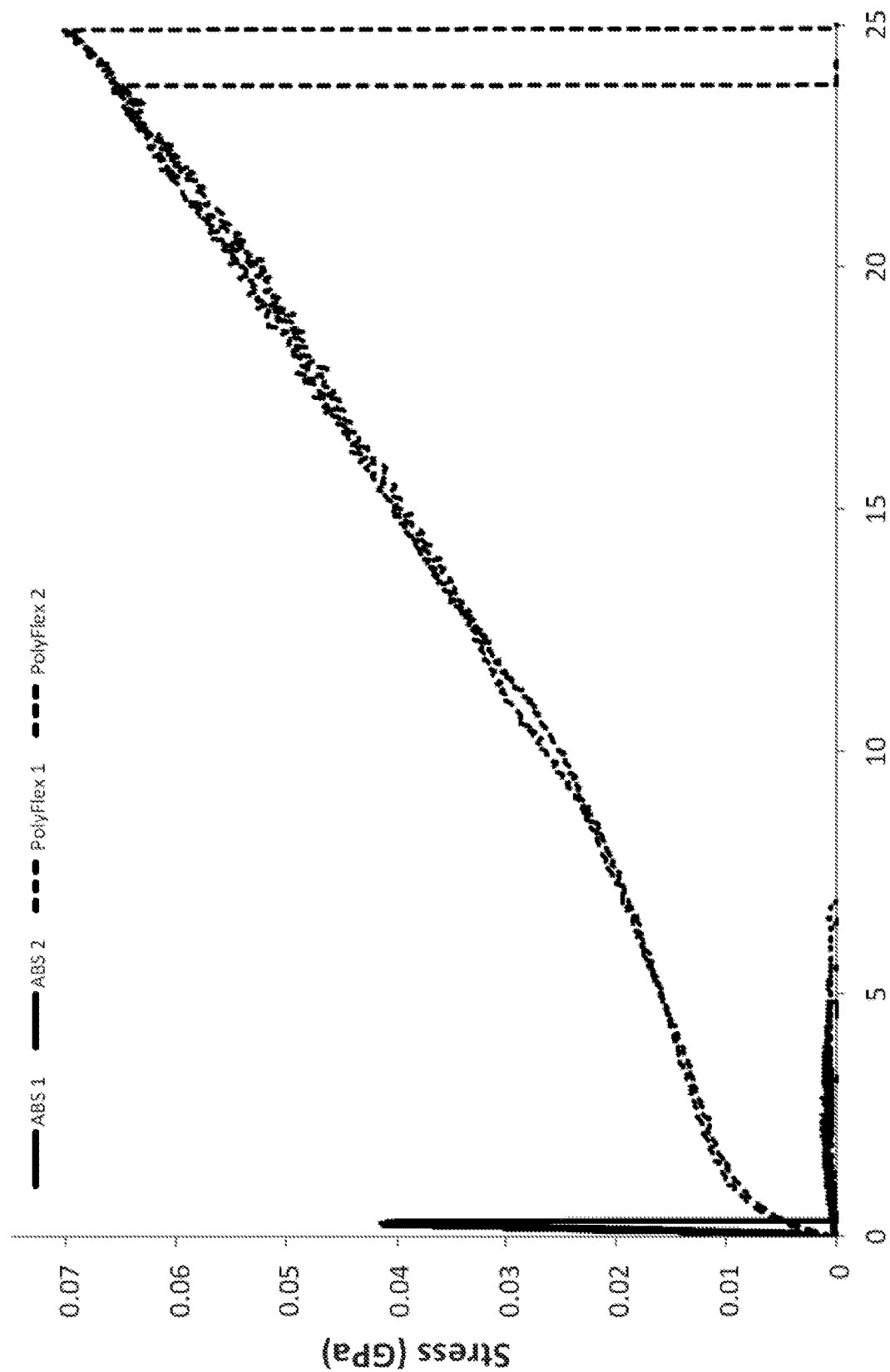
FIG. 4A is a plot of stress (GPa) versus strain tensile testing performed on samples of ABS, POLYFLEX™ (Polymaker LLC, Great Neck, N.Y., USA), and piezoresistive composite materials of four different conductive filler material to elastomer (TPE) ratios (1:1, 1.33:1, 1.66:1, and 2:1).

Provided herein are flexible sensors incorporating piezoresistive elements arranged between first and second electrodes. A piezoresistive element includes a conductive filler material dispersed in a thermoplastic elastomer, wherein deformation of the thermoplastic elastomer (e.g., by compression, bending, shear, etc.) alters the spacing between conductive filler particles, thereby altering electrical resistance between the first and second electrodes. In certain embodiments, a constant voltage may be applied between the first and second electrodes, and current may be detected as a basis to determine resistance according to Ohm's Law. Methods for fabricating flexible sensors incorporating piezoresistive elements are further provided.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items. Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In certain embodiments, piezoresistive elements of flexible sensors may be produced by steps including 3D printing or molding (e.g., gravity molding or injection molding). To demonstrate aspects of the disclosure, various flexible sensors incorporating piezoresistive elements arranged between first and second electrodes were produced, utilizing thermoplastic Fused Filament Fabrication (FFF) 3D printing or molding for producing composite piezoresistive materials incorporating conductive filler material dispersed in a thermoplastic elastomer. Such sensors are suitable for use in prosthetic and/or medical device feedback systems as applied to daily activities encountered by users.

In certain embodiments, flexible sensors may incorporate low elastic modulus composite piezoresistive materials comprising a compressible thermoplastic elastomer and a conductive filler material such as carbon (e.g., graphite) dispersed therein. In certain embodiments, composite piezoresistive materials may include a greater mass fraction of conductive filler material than of thermoplastic elastomer.

Cross-sectional views of an exemplary flexible sensor 10 in an uncompressed state and in a compressed state are shown in FIGS. 1A and 1B, respectively. A change in spacing between conductive filler material (e.g., particles) 14 distributed in a thermoplastic elastomeric material 16 in an uncompressed state versus a compressed state is visible upon comparison of FIGS. 1A and 1B. As shown in FIG. 1A, the flexible sensor 10 includes a piezoresistive composite material 12, including a conductive filler material 14 dispersed in the thermoplastic elastomeric material 16, arranged between a first electrode 18 and a second electrode 20. Referring to FIG. 1B, upon application of a compressive force F, the flexible sensor 10 is placed into a compressed state, in which average spacing between particles of conductive filler material 14 is reduced due to compression of the thermoplastic elastomeric material 16. Such compression alters the electrical properties of the piezoresistive composite material 12 (e.g., by decreasing resistance between the first and second electrodes 18, 20). Upon application of a signal across the first and second electrodes 18, 20, a change in electrical properties of the piezoresistive composite material 12 may be detected, with such variation correlating to a physical property exerted on the flexible sensor 10 (e.g., pressure).

In certain embodiments, a flexible sensor incorporating a piezoresistive element as disclosed herein is mechanically compressible to allow for a change in resistance, is amenable to fabrication by molding or 3D printing (e.g., using FFF in one step with no post-processing needed), is flexible, has a rubber-like finish that allows it to feel similar to human skin, can be customized to various shapes and designs to facilitate incorporation into a prosthetic or medical device, and has a thickness within the average human skin thickness (e.g., from about 1 mm to about 3 mm).

Despite advances in 3D printing of medical devices, Applicant is not aware of 3D printed pressure sensors or sensors incorporating highly elastic piezoresistive materials. Current work that may benefit from flexible sensors as disclosed herein includes areas such as tissue scaffolding, anatomical molds for veterinarian research, surgical and patient training, tissue regeneration guides, and prosthetic hands/fingers. Piezoresistive elements fabricated by FFF 3D printing were printed on a MAKERGEAR® M2 printing apparatus (MakerGear, LLC, Beachwood, Ohio, USA), with SIMPLIFY3D® software (Simplify3D LLC, Cincinnati, Ohio, USA), and tested on an MTS® Sintech Model 1/S tensile machine (MTS Systems Corp., Eden Prairie, Minn., USA) (with a maximum load cell capability of 1,000 lbs) and CH Instrument for measuring changes in current. 3D printed designs were made using SOLIDWORKS® 3D CAD software (Dassault Systemes SolidWorks Corporation, Waltham, Mass., USA) and pellets of the composite material were fed through a filament extruder to create a 1.75 mm diameter filament for 3D printing. Additional piezoresistive elements were produced using gravity molds as described herein.

Polystyrene ethylene butylene styrene (SEBS), a compressible thermoplastic elastomer (TPE), was chosen due to its tactile feel, compressibility, and easy application in injection molding. Since FFF 3D printing has a close relationship to injection molding, SEBS provided an additional benefit in processability in filament form along with its tactile feel and synthetic skin applications.

The piezoresistive composite material was created by first dissolving the SEBS pellets in toluene, with a 1.2:1 ratio of toluene to SEBS, to break the SEBS pellets down to a liquid state. SEBS is a difficult polymer to get into a flowable state without injection molding. In order to incorporate the conductive filler material into the TPE, the SEBS needed to be in a flowable state to permit it to be stirred. To accomplish this, toluene was added to the SEBS pellets and left for 24 hours at room temperature to dissolve the polymer and yield a flowable viscous gel.

Thereafter, conductive graphite was added to the flowable viscous gel. A high filler fraction of graphite is necessary to create a conductive piezoresistive composite material, such as a mass ratio range of from 1:1 to 2:1 of graphite to SEBS only (not SEBS plus toluene). The densities of SEBS and graphite are 0.85 g/cm$^3$ and 2.25 g/cm$^3$, respectively. Multiple iterations were created to assess changes in conduction attributable to changes in conductive filler material ratios, and to assess results of FFF 3D printing with materials with low elastic modulus and high filler ratios.

The graphite filler/gel mixture was then thoroughly stirred until the graphite was dispersed within the polymer and toluene solution. Thereafter, the mixture was placed in a gravity fed mold and allowed to sit for an additional 24 to 48 hours until the toluene had fully evaporated out of mixture. Toluene was chosen since it is highly evaporative at room temperature and pressure.

Following evaporation of toluene out of the mixture, the resulting product included only graphite (carbon) distributed within the SEBS polymer. Distribution of the conductive particles allowed the particles to be compressed when a pressure was applied and brought the particles closer together. This allowed for a change in resistance to take place due to the decrease in space between the conductive particles.

Following evaporation of the toluene, a first group of graphite/SEBS composite samples were removed from the mold and cut into 12 mm×12 mm square shapes with a thickness of 2.54 mm to yield molded samples for testing. Additionally, a second group of graphite/SEBS composite samples were cut into square pellets that were fed into a filament extruder at 95-100° C. to create a 1.75 mm filament for FFF 3D printing. To create the 3D printed samples, filament was fed through the FFF 3D printer with the settings specified in FIG. 17, to yield 3D printed samples according to the sample size stated above.

Printed samples were printed longitudinally (i.e., perpendicular to the direction of applied compression) to provide the greatest strength, since printing parallel to the direction of applied compression would result in a weaker sample due to the layer adhesion strength of FFF parts. This same effect has been observed by others.[30]

When printing on a Fused Filament Fabrication device, it is difficult to force a weak and flexible material through the nozzle for extrusion. The difficulty is caused by the fact that the filament relies on the high temperature of the nozzle along with pressure from a feeder gear that is located away from a heating chamber and the nozzle. With the composite materials described here, the feeder gear is far away from the nozzle and may cause buckling within the feeder tube, heating chamber, and nozzle.

A conventional heater tube/nozzle assembly 30 is shown in FIG. 2. The heater tube/nozzle assembly 30 includes a heater tube 32 arranged upstream of a nozzle 34 having a tapered width, wherein a bore 33 defined by the heater tube 32 is arranged in fluid communication with a bore 35 defined by the nozzle 34. A feeder tube (not shown) is arranged upstream of the heater tube 32. FIG. 3 shows a modified heater tube/nozzle assembly 40 useful for producing piezoresistive elements as disclosed herein via fused filament fabrication. The modified heater tube/nozzle assembly 40 includes a heater tube 42 arranged upstream of a nozzle 44 having a tapered width, wherein a bore 43 defined by the heater tube 42 is arranged in fluid communication with a bore 45 defined by the nozzle 44. A feeder gear 46 and complementary idler pulley 48 engage a rod-like filament structure 49, whereby rotation of the feeder gear 46 causes the rod-like filament structure 49 to advance through the bores 43, 45 defined by the heater tube 42 and the nozzle 44, respectively. In order for the samples to be 3D printed and to decrease the chance of buckling within a feeder tube, the extruder nozzle bore and heater tube bore diameters needed to be increased from the standard 0.35 mm diameter (shown in FIG. 2) to a much larger 1.58 mm diameter (shown in FIG. 3) for both 1:1 and 1.33:1 conductive filler material to TPE ratios. The large 1.58 mm diameter of the bores 43, 45 defined by the heater tube 42 and nozzle 44, in tandem with the 1.75 mm diameter of the rod-like filament structure 49, resulted in very little backpressure to the feeder gear 46, and resulted in the use of almost solely radiating heat to convert the composite filament to a molten state. This style of printing differs from a standard FFF 3D printing technique in which temperature and pressure are used to promote melting of the filament for extrusion. Thus, in certain embodiments, a fused filament fabrication process comprises passing a rod-like filament structure having a first width or diameter through a heated structure including a discharge nozzle comprising a second width or diameter, wherein the first width or diameter exceeds the second width or diameter, but is no more than about 15% larger than the second width or diameter.

Upon modification of the diameter of the bores 43, 45 of the heater tube 42 and nozzle 44, the modified nozzle diameter is only reduced by 0.17 mm relative to the filament diameter, whereas printing with ABS uses a 0.35 mm nozzle diameter and causes a diameter reduction of 1.4 mm. The larger nozzle opening (bore 45) allows for little back-pressure on the rod-like filament structure 49 and also compensates for the thermal expansion of the piezoresistive composite material. Since the piezoresistive composite material uses a conductive filler material that is incompressible and non-flowable, when the polymer matrix expands, it pushes the graphite particles in an outwards direction and increases the diameter of the filament without having the particles transition to a molten state. Therefore, mostly radiating heat is applied with very little pressure and slow speeds to 3D print composites with large filler ratios. One potential issue that can be encountered during FFF 3D printing is that the filament is subject to slipping (and becoming stationary) during extrusion, resulting in stoppage of extrusion. This slippage may be caused by the extremely soft, flexible, and low-friction properties of the carbon-filled filament. To overcome this with current FFF feed systems, the extrusion multiplier should be greater than one to maintain filament extrusion despite slippage. The extrusion multiplier causes the rate of extrusion from the feeder gear to be larger than a predefined software feed rate. Due to this higher rate of extrusion, filament can emerge during non-slippage points in larger volumes, which causes lobes to be printed instead of a continuing fine line. Despite this, the 3D printed sensors characterized herein still provided accurate results based on the slopes/trends and high correlation values shown between the 3D printed versus molded samples, and based on the overall shapes of the 3D printed sensors being slightly dimensionally different from the molded samples. If desired, an improved filament feed system may be provided, in which a conventional feeder gear and idler pulley may be replaced with a double-sided vertical rubber belt feed system that can increase the contact area against the filament and support the filament in between the feeder system and heating nozzle to prevent slippage. Additionally, a distance between the feeder system and heating nozzle may be reduced to help prevent buckling within the feeder system. This modification will help provide a constant flow rate of filament and allow for the increased extrusion multiplier to go back to baseline.

To characterize the elasticity of the piezoresistive composites and provide a basis for comparison to conventional 3D printing materials (ABS and POLYFLEX™) tensile testing with a sample size of N=2 was performed. POLYFLEX™ is a flexible material having a large strain to failure characteristic. Filament strands were tested under tension to demonstrate the elastic modulus of the graphite/SEBS composite. Tensile testing used fixtures in which the filament wrapped around a barrel on the top and bottom and was then fixed in place, leaving a precise gage length for testing. Samples were pulled at a strain rate of 500 mm/min, following the ASTM D638 standard. 500 mm/min was chosen over 5 or 50 mm/min because the high strain rate places more emphasis on the elastic region of the composite rather than the energy dampening effect of composite.

Figure 4B:
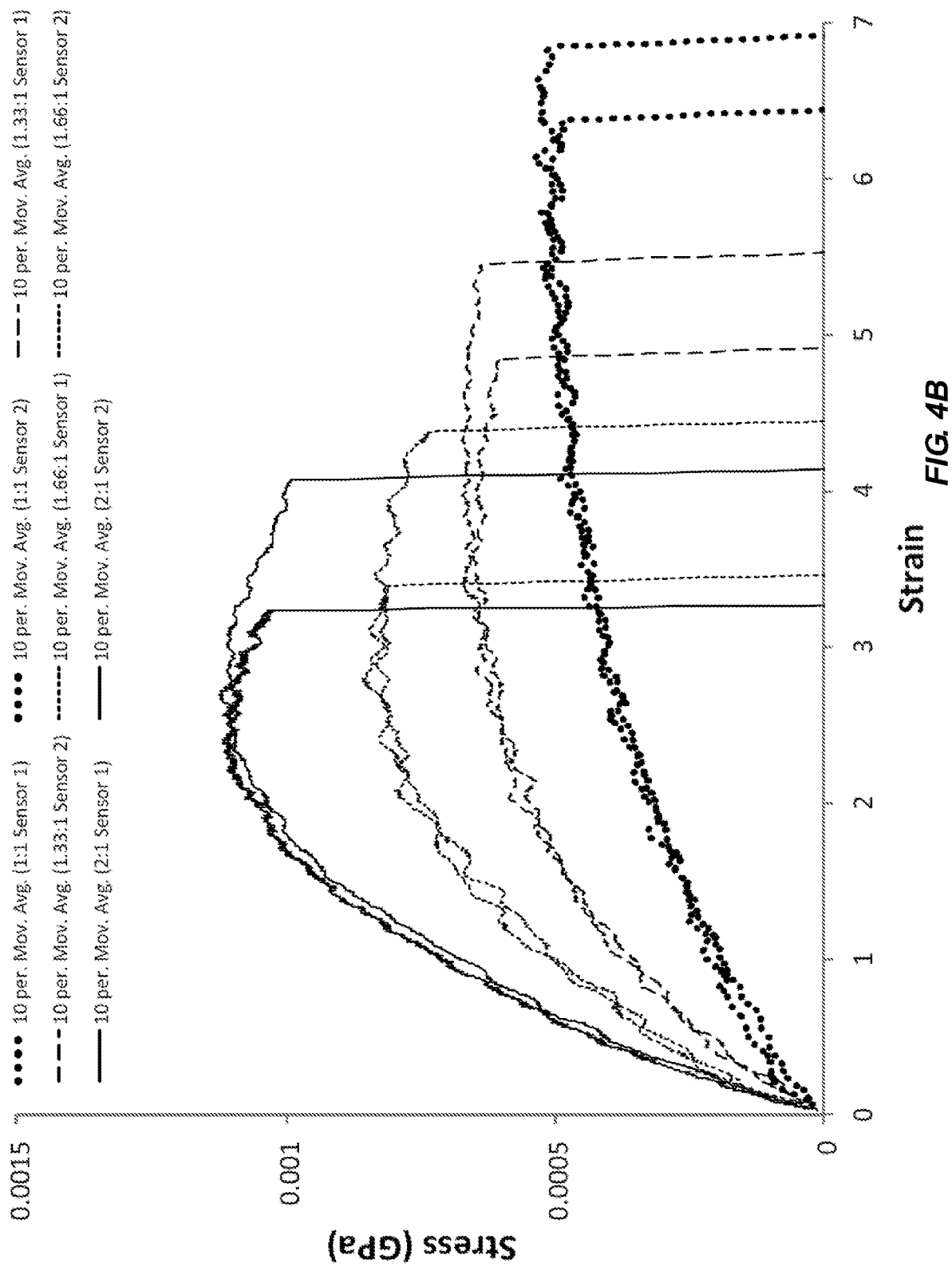
FIG. 4B is a magnified portion of the stress versus strain plot of FIG. 4A proximate to the origin, showing the piezoresistive composite materials only.

Results of tensile testing are shown in FIGS. 4A and 4B. FIG. 4A is a plot of stress (GPa) versus strain tensile testing performed on samples of ABS, POLYFLEX™, and piezoresistive composite materials of four different conductive filler material to elastomer (TPE) ratios (1:1, 1.33:1, 1.66:1, and 2:1), whereas FIG. 4B is a magnified portion of FIG. 4A proximate to the origin, showing the piezoresistive composite materials only. Sensor composite filaments were plotted with a moving average, with the top runs being the 2:1 ratio and with the 1:1 ratio runs at the bottom.

The piezoresistive composite materials exhibited such low elastic modules values that their plots are barely visible at the bottom of FIG. 4A, thereby giving rise to the need for the magnified view shown in FIG. 4B. The results show that with the increase in filler mass or volume, the ultimate tensile strength and elastic modulus increases from $1.83 \times 10^{-4}$ GPa for a 1:1 ratio to $6.01 \times 10^{-4}$ GPa for a 2:1 ratio, with 1.33:1 and 1.66:1 having modulus values of $3.17 \times 10^{-4}$ GPa and $4.64 \times 10^{-4}$ GPa respectively. The plotted data of the composites uses a moving average to remove noise from the data plots. These results are expected and follow correct mechanical and material science theories. The increase in mechanical reinforcements to a matrix increases the load absorbing properties by allowing a transfer of load to the higher strength material from the weaker matrix and decreases the mechanical strain caused by the reinforcement material that a composite can withstand.

When comparing the composite modulus of elasticity results to ABS or POLYFLEX™, which have modulus of elasticity values of 0.18 GPa and $2.72 \times 10^{-3}$ GPa respectively, we can see in FIGS. 4A and 4B that the modulus of elasticity, and additionally the maximum tensile strengths, of the composites are low are compared to these standard FFF 3D printing materials. This demonstrates that piezoresistive composite material is extremely weak, with maximum tensile strengths between 0.00057 GPa-0.0011 GPa, as compared with ABS and POLYFLEX™ having tensile strengths of 0.41 GPa and 0.70 GPa, respectively.

Figure 5:
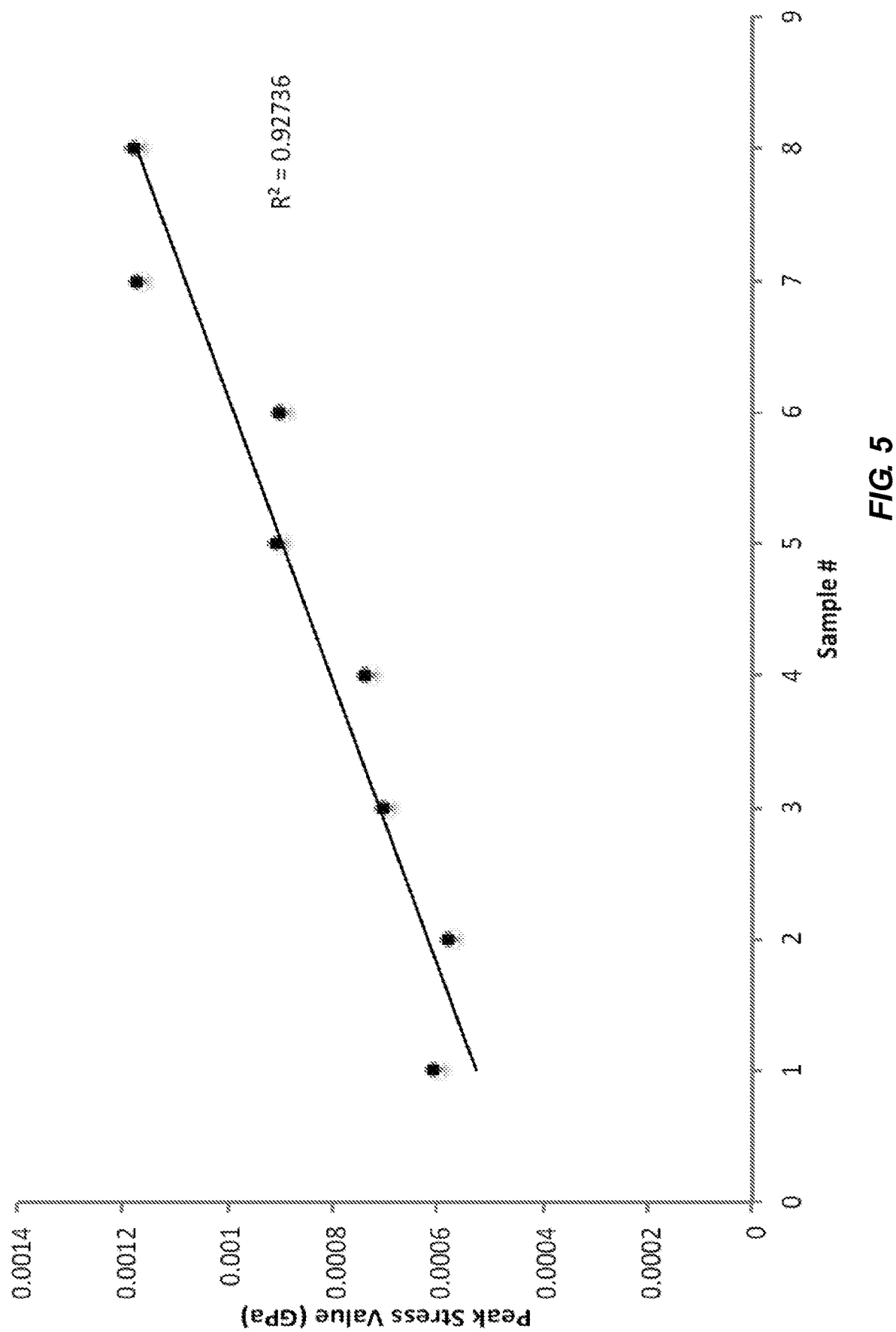
FIG. 5 is a plot of peak stress value (GPa) obtained by tensile testing versus sample number, wherein the sample numbers represent the four different conductive filler material to elastomer (TPE) ratios (1:1, 1.33:1, 1.66:1, and 2:1) and the two samples in each filament type.

FIG. 5 is a plot of peak stress value (GPa) obtained by tensile testing versus sample number, wherein the sample numbers (1 to 8) represent the four different conductive filler material to elastomer (TPE) ratios (1:1, 1.33:1, 1.66:1, and 2:1) and the two samples in each filament type. As shown in FIG. 5, each pair of samples (1 and 2, 3 and 4, 5 and 6, 7 and 8) exhibited consistent properties, with a substantially linearly relationship between peak stress value and increasing conductive filler ratio.

Figure 6:
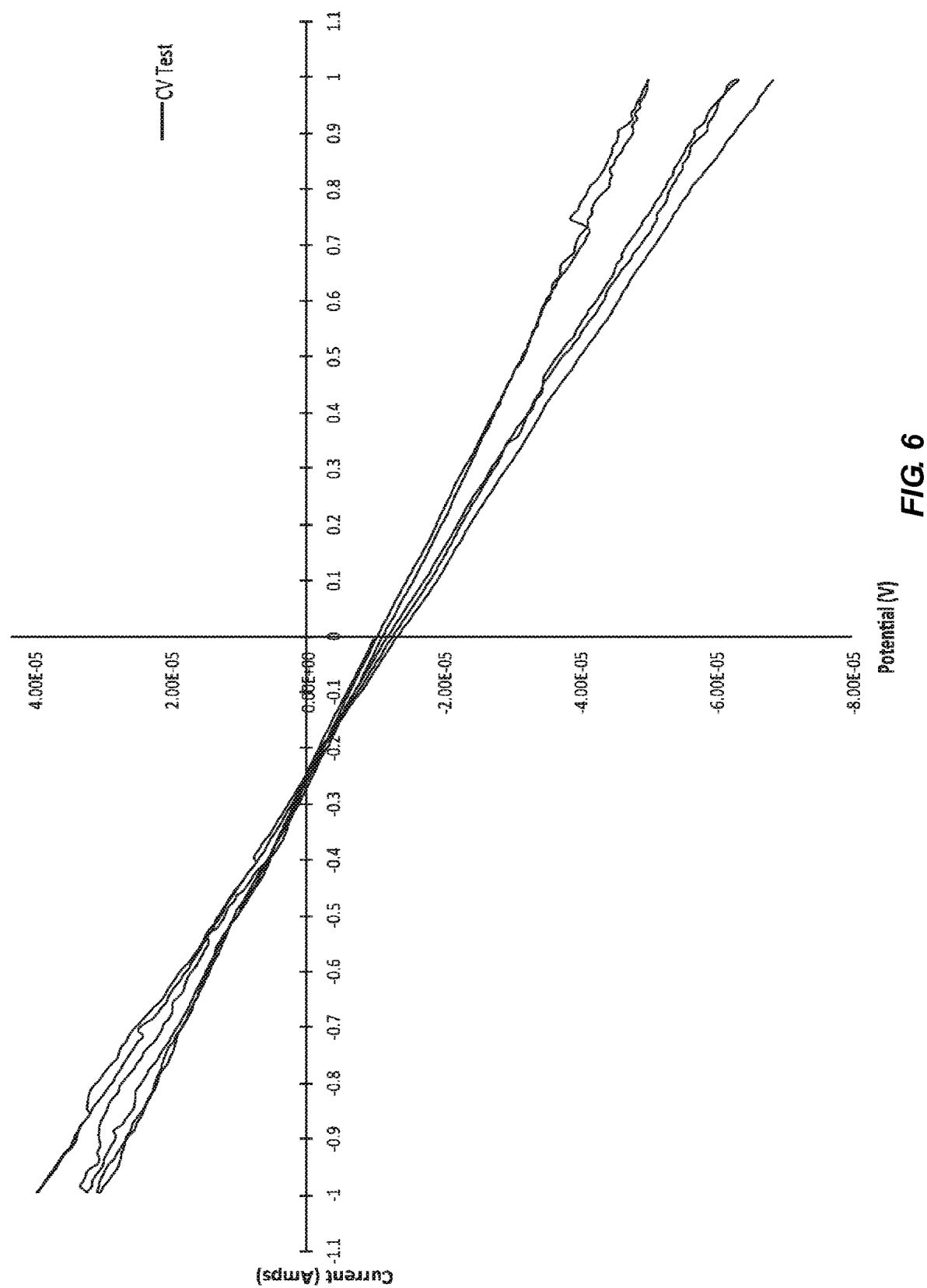
FIG. 6 is a plot of current (amperes) versus potential (volts) obtained by cyclic voltammetry testing to determine the optimal applied voltage level of various flexible sensors incorporating piezoresistive composite materials with differing ratios of conductive filler material and TPE.

To determine the optimal applied voltage for sensors incorporating the piezoresistive composite materials as disclosed herein, cyclic voltammetry (CV) was performed on a molded sample with no applied pressure, as shown in FIG. 6. CV testing was performed on a 12 mm×12 mm×2.54 mm sample with a 2:1 composite ratio with no applied pressure to its surface. The 2:1 sample was placed on a pressure test fixture, and a CH Instrument performed five sweeps from −1.0V to 1.0V and records the current output, where a sweep was from −1.0V to 1.0V. The ideal voltage was selected by choosing the location where each sweep had the greatest overlap. The ideal voltage chosen for the 2:1 sample and subsequently all other composite ratios was −0.2V. When reviewing FIG. 6, we can see that there is more scatter at the outer edges of the sweep pattern. If a voltage was chosen within the scatter areas, then it could induce noise into the pressure sensor data and cause an error in the recordings.

Figure 7A:
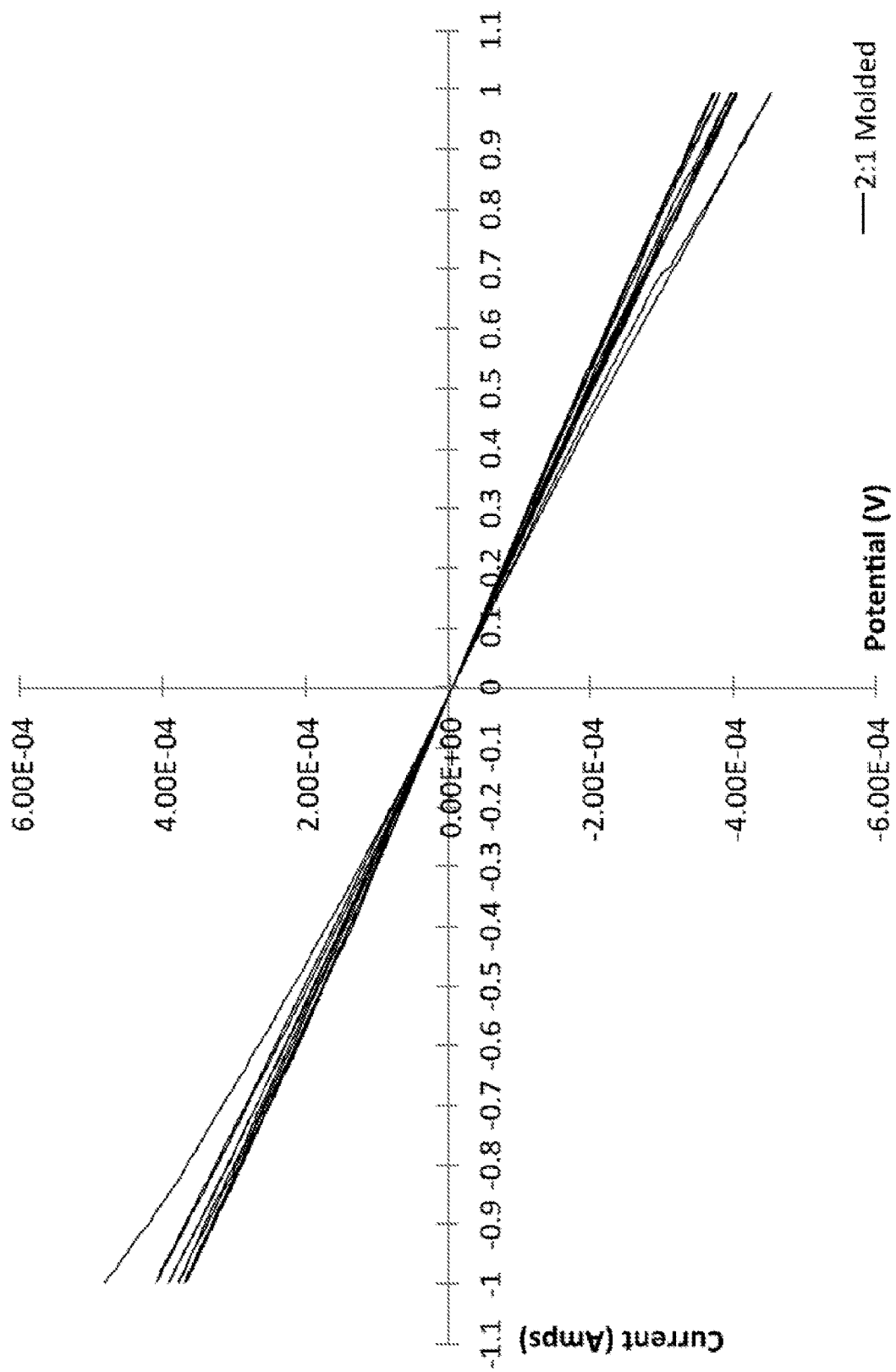
FIG. 7A is a plot of current (amperes) versus potential (volts) obtained by cyclic voltammetry testing of an unloaded molded pressure sensor to determine optimal applied voltage.
Figure 7B:
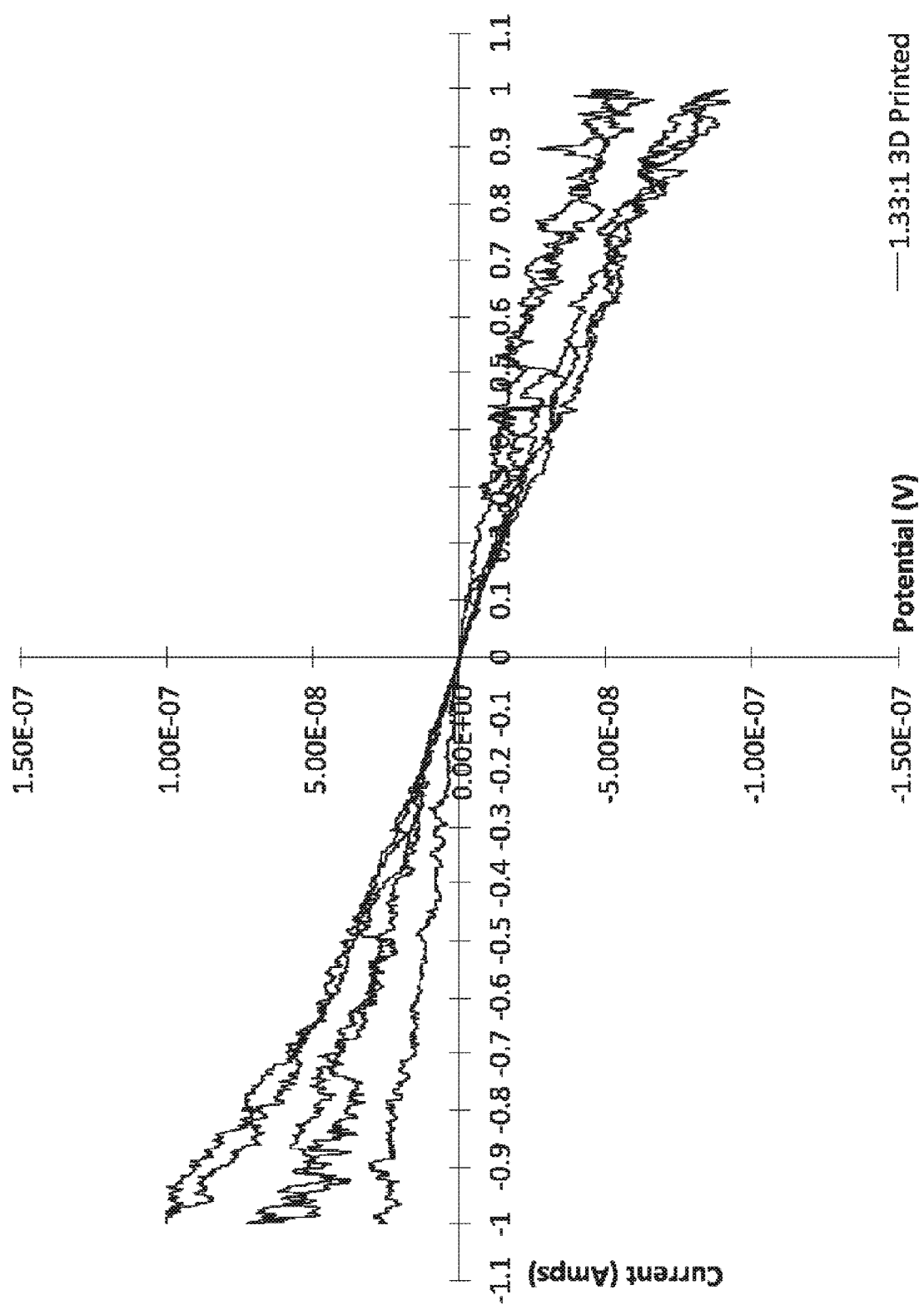
FIG. 7B is a plot of current (amperes) versus potential (volts) obtained by cyclic voltammetry of a flexible sensor incorporating a piezoresistive element including a piezoresistive composite material having a 1.33:1 conductive filler material to elastomer (TPE) ratio, and produced by a fused filament fabrication process.
Figure 7C:
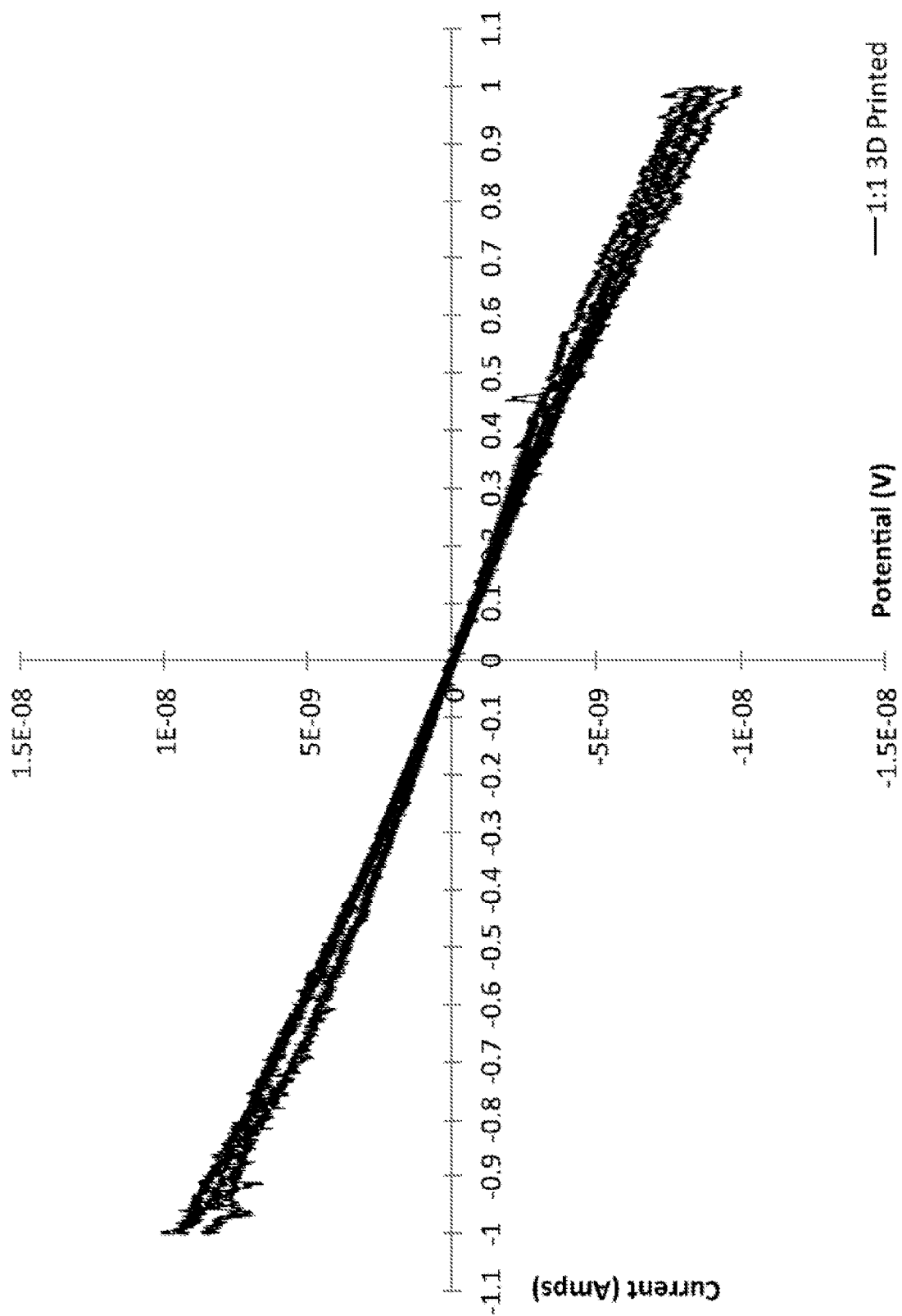
FIG. 7C is a plot of current (amperes) versus potential (volts) obtained by cyclic voltammetry of a flexible sensor incorporating a piezoresistive element including a piezoresistive composite material having a 1:1 conductive filler material to elastomer (TPE) ratio, and produced by a fused filament fabrication process.

FIGS. 7A-7C provide plots of current (amperes) versus potential (volts) obtained by additional cyclic voltammetry testing runs. FIG. 7A is a plot of current versus potential obtained by cyclic voltammetry testing of an unloaded molded pressure sensor. FIGS. 7B and 7C provide plots of current versus potential obtained by cyclic voltammetry of flexible sensors each incorporating a piezoresistive element including a piezoresistive composite material having 1.33:1 and 1:1 conductive filler material to elastomer (TPE) ratios, respectively, and produced by a fused filament fabrication process.

The same applied voltage was used for consistency across all data samples, except for the 1:1 3D printed sample, and for future sensor design simplicity. If multiple composites were to be used in tandem to create a dual-purpose pressure sensor, then having one voltage for calibration would have reduced the complexity of the system.

Subsequently, the determined applied voltage of −0.2 volts was used for testing the molded and 3D printed samples. Use of a low operating voltage renders a flexible sensor safe for use with prosthetics and/or medical devices, and safe for interfacing with various objects.

After characterizing the elastic moduli of the multiple piezoresistive composite materials and determining the ideal applied voltage, flexible pressure sensors including molded and 3D printed piezoresistive elements were pressure tested with masses ranging from 0.25 grams to 750 grams. All samples were tested with various applied pressures using calibrated masses and a constant applied voltage.

The various composite mass-to-mass ratios used were 0.75:1, 1:1, 1.33:1, 1.66:1, and 2:1 (conductive filler material to TPE), to demonstrate the lower limit of conductive filler material necessary to render the piezoresistive composite material electrically conductive, and to demonstrate the upper limit of conductive filler material to TPE ratio that can be FFF 3D printed and be mixed together until no improvement in sensing can be measured (in other words, a point at which the lower pressure detection limit did not improve from the previous iteration).

Figure 8:
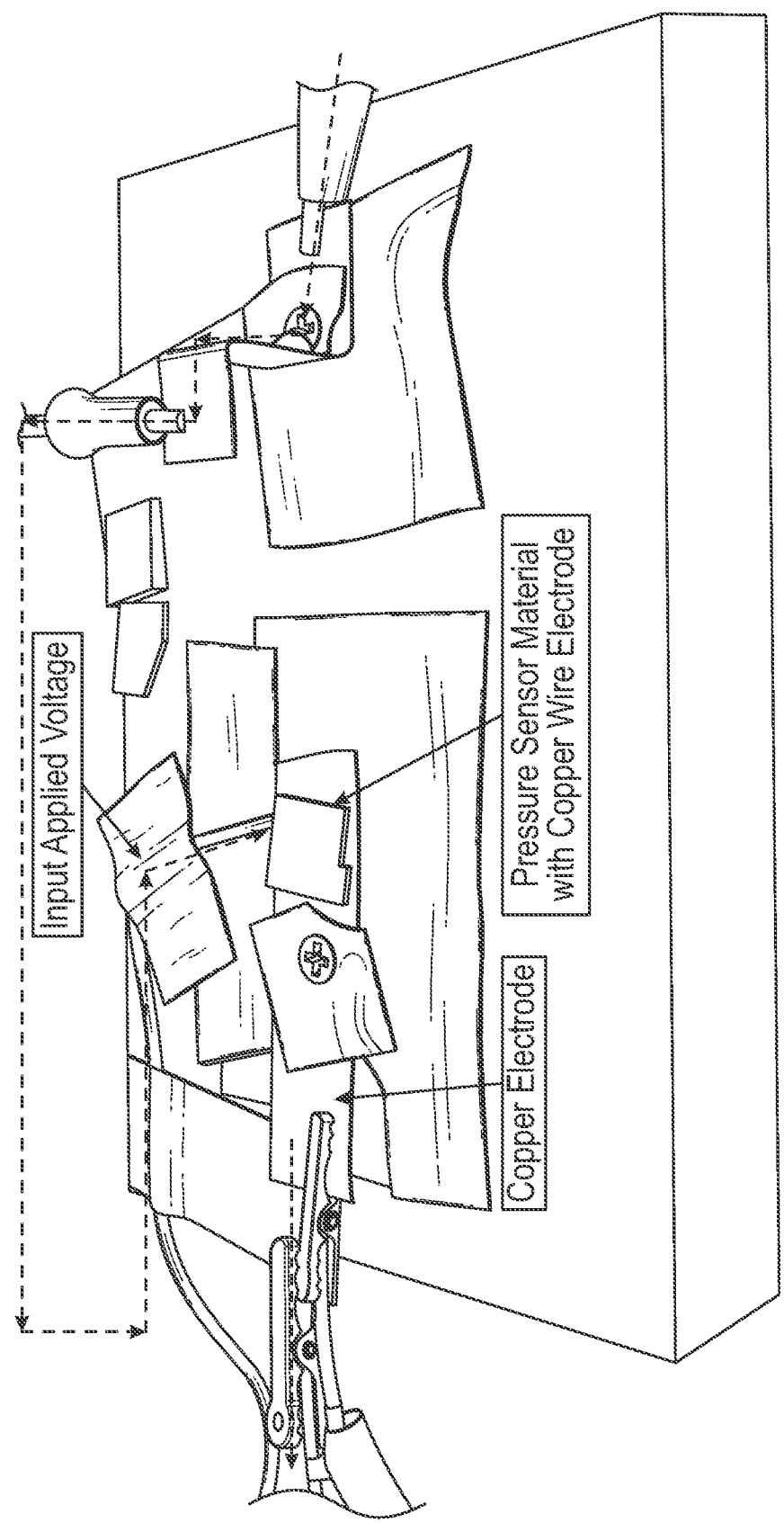
FIG. 8 is an illustration of a test fixture for a flexible pressure sensor incorporating a piezoresistive composite material arranged between a first electrode and a second electrode according to one embodiment.
Figure 9:
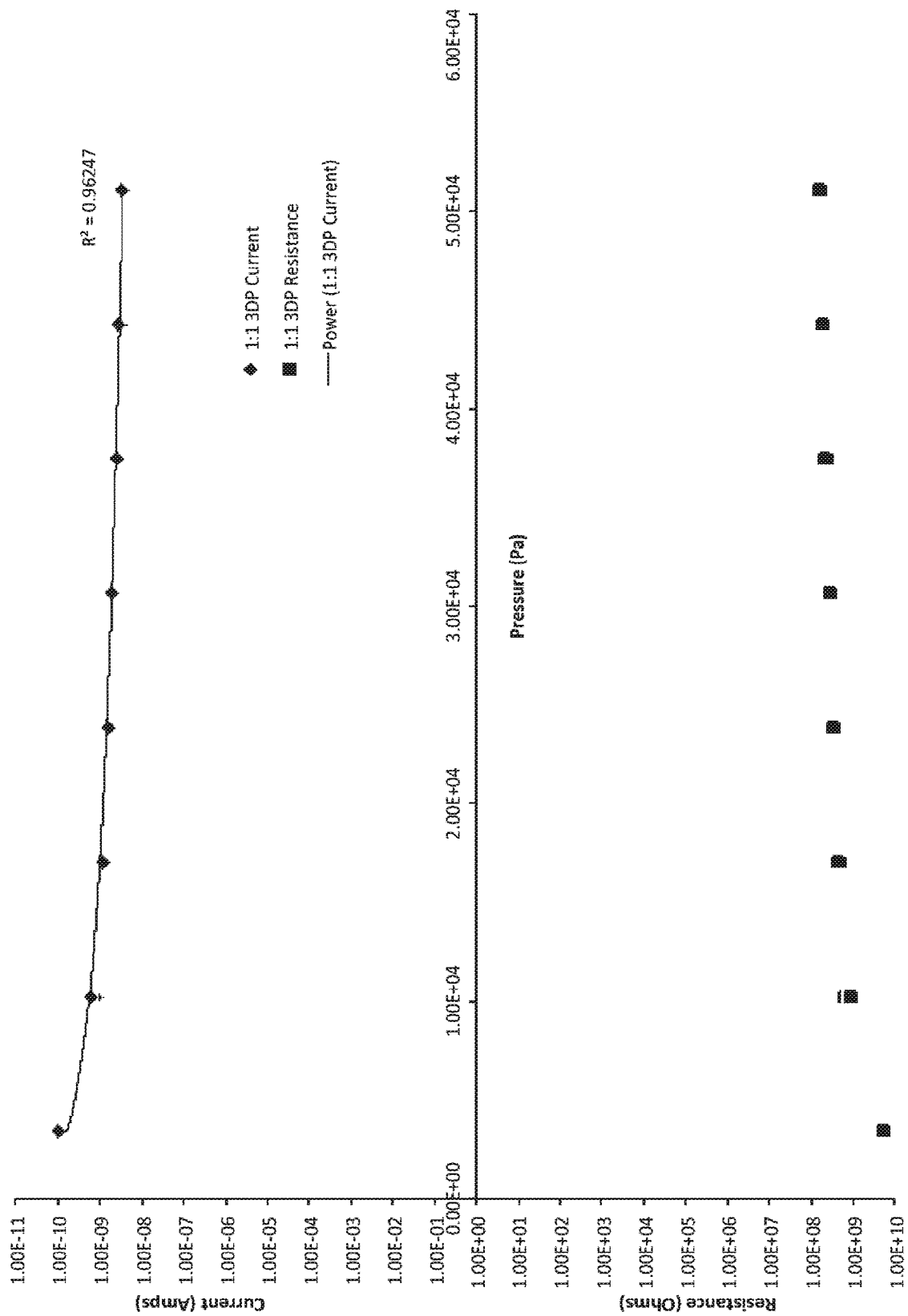
FIG. 9 includes $\log_{10}$ plots of current and resistance as a function of pressure (Pa) for a flexible sensor incorporating a piezoresistive element including a piezoresistive composite material having a 1:1 conductive filler material to elastomer (TPE) ratio and produced by 3D printing according to a fused filament fabrication process.
Figure 10:
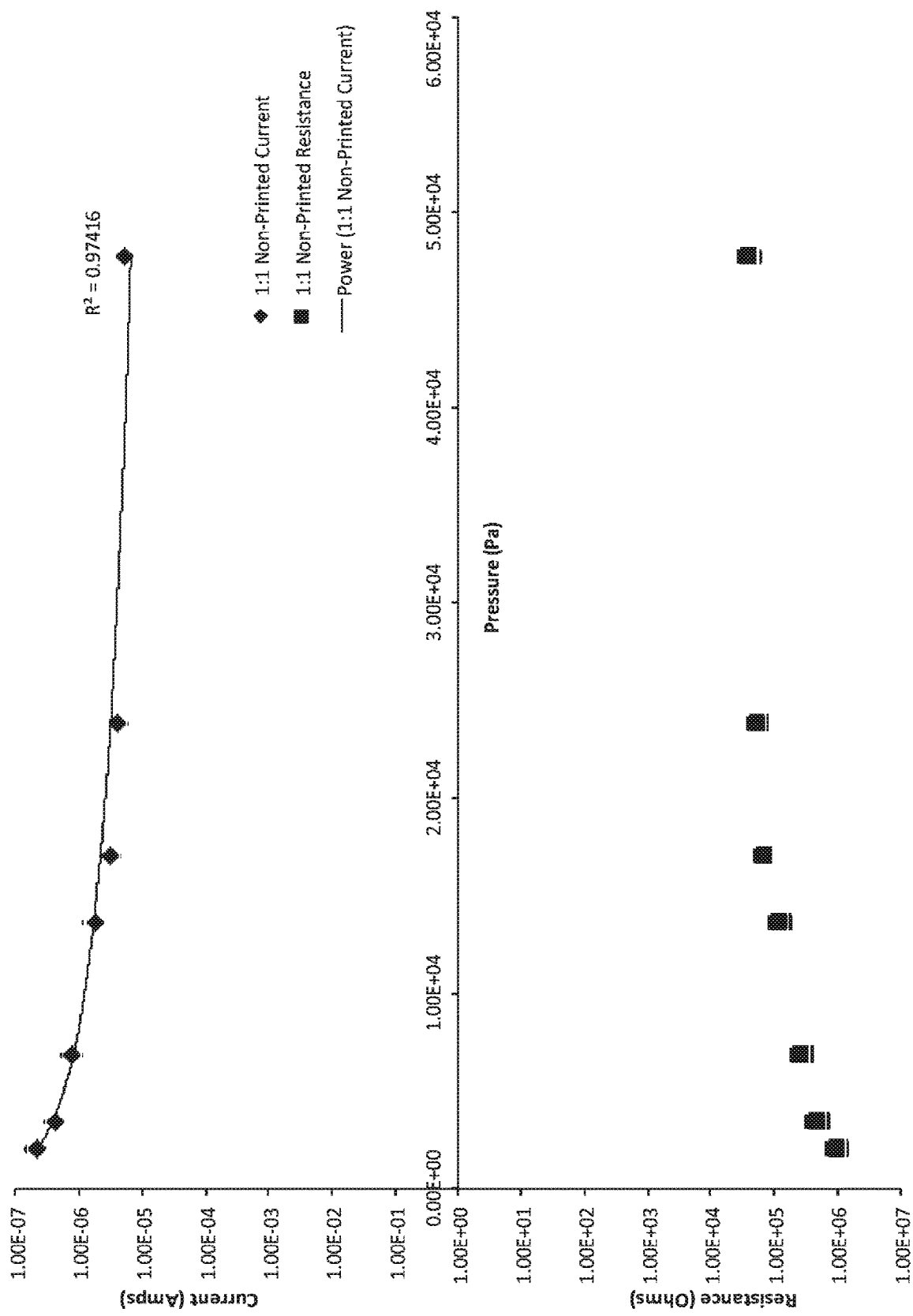
FIG. 10 includes $\log_{10}$ plots of current and resistance as a function of pressure (Pa) for a flexible sensor incorporating a piezoresistive element including a piezoresistive composite material having a 1:1 conductive filler material to elastomer (TPE) ratio and produced by a molding process.
Figure 11:
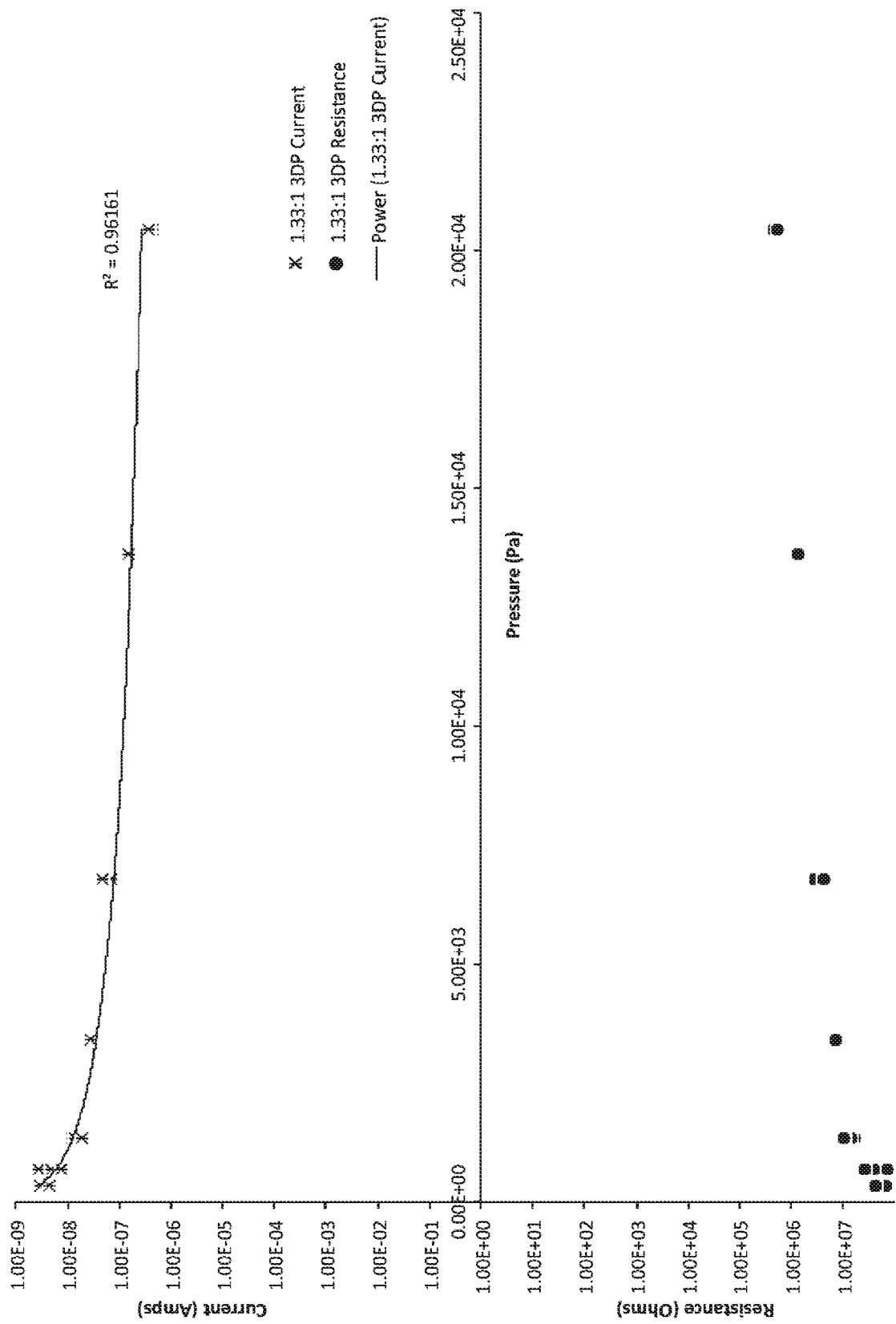
FIG. 11 includes $\log_{10}$ plots of current and resistance as a function of pressure (Pa) for a flexible sensor incorporating a piezoresistive element including a piezoresistive composite material having a 1.33:1 conductive filler material to elastomer (TPE) ratio and produced by 3D printing according to a fused filament fabrication process.
Figure 12:
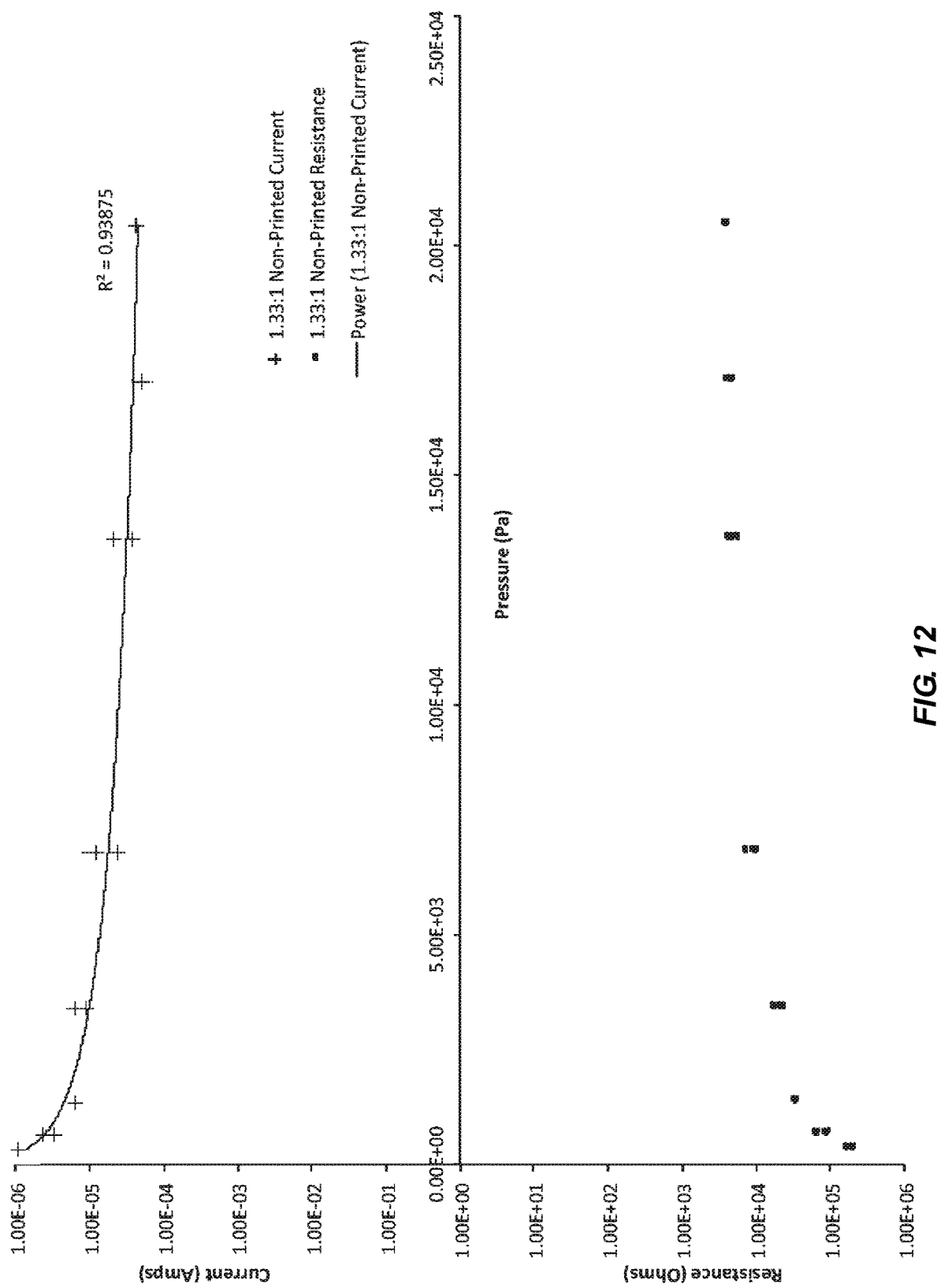
FIG. 12 includes $\log_{10}$ plots of current and resistance as a function of pressure (Pa) for a flexible sensor incorporating a piezoresistive element including a piezoresistive composite material having a 1.33:1 conductive filler material to elastomer (TPE) ratio and produced by a molding process.
Figure 13:
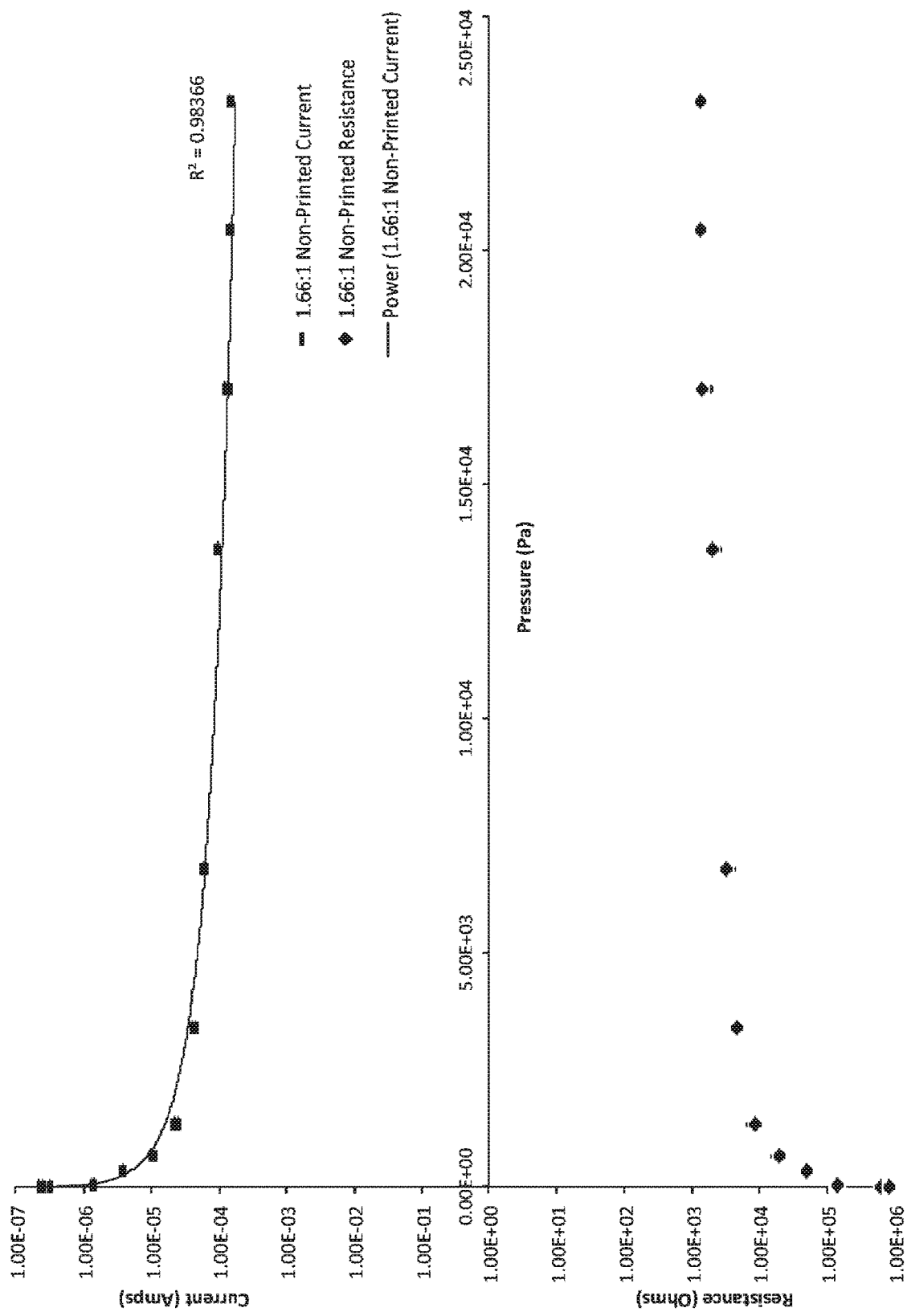
FIG. 13 includes $\log_{10}$ plots of current and resistance as a function of pressure (Pa) for a flexible sensor incorporating a piezoresistive element including a piezoresistive composite material having a 1.66:1 conductive filler material to elastomer (TPE) ratio and produced by a molding process.
Figure 14:
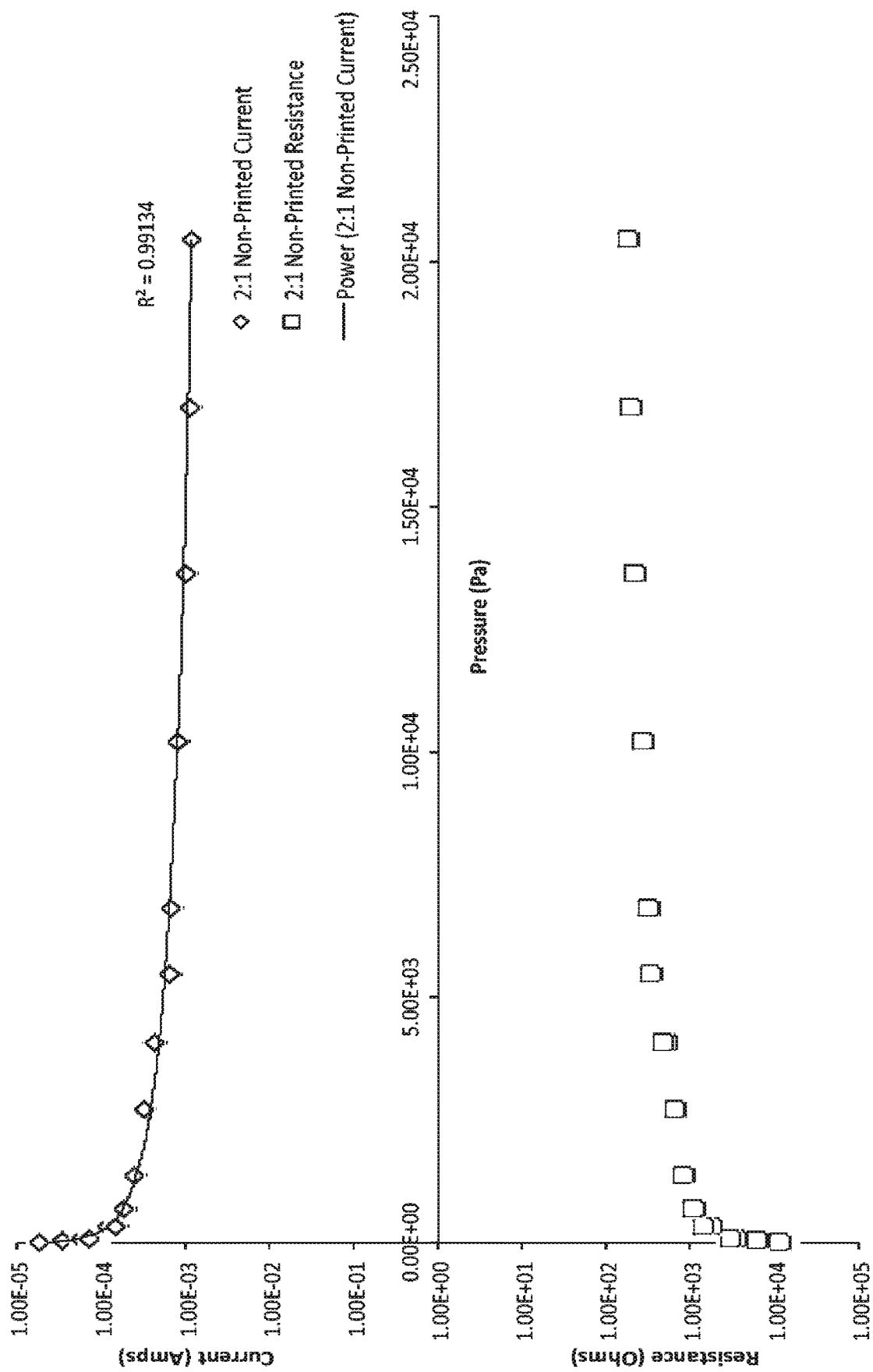
FIG. 14 includes $\log_{10}$ plots of current and resistance as a function of pressure (Pa) for a flexible sensor incorporating a piezoresistive element including a piezoresistive composite material having a 2:1 conductive filler material to elastomer (TPE) ratio and produced by a molding process.

All pressure testing samples of piezoresistive composite material were placed on a custom test fixture with a copper plate on the bottom to serve as the bottom electrode, and with a copper wire electrode placed on top to form a circuit. The test fixture with a flexible pressure sensor contained therein is shown in FIG. 8. White dotted line arrows represent the flow of current through the circuit. 3D FFF printed piezoresistive composite material was arranged on a flat copper electrode and a copper wire electrode was applied to a top surface of the piezoresistive composite material. Vinyl insulating tape was used above the copper wire electrode to prevent any electrical interaction between the copper wire electrode and the brass weights used to apply pressure to the sample. In the test setup, the top side copper wire electrode carried the applied voltage and the bottom side copper plate electrode carried the output signal to the CH Instrument. Although a copper plate and wire were used in this embodiment, it is to be appreciated that electrodes of any suitable material and conformation may be used. In certain embodiments, one or more metal layers (e.g., foils, plates, strips, or the like) may directly receive piezoresistive composite material that is printed or molded thereon, or electrical and mechanical connections with such metal layer(s) may be made by suitable electrically conductive adhesives. In certain embodiments, conductive polymers may be used for the electrodes.

After determining the applied constant voltage and characterizing the composite mechanical properties, the molded and 3D printed samples with ratios ranging from 0.75:1 to 2:1 were tested to determine the pressure range that each sensor type could record. The molded samples were formed in a cylinder mold and cut into the 12 mm×12 mm×2.54 mm samples, while the 3D printed samples were printed with a layer height of 0.6 mm and seven shells to print a 12 mm×12 mm×2.54 mm sensor. A layer height of 0.6 mm was the only successful printing layer since smaller layer heights caused large gaps to occur and a larger layer would cause the last layer to be drastically different from the lower layers. Once the samples were fabricated, the samples were placed on the pressure sensor fixture and calibrated masses were placed and centered on top of the sensor.

FIG. 18 shows the minimum and maximum pressures that each molded and printed sensor can detect along with the masses used to reach each pressure. The table shows that there is a difference in the maximum and minimum pressures depending on the amount of conductive material added to the base polymer matrix. There are large differences between the lower and high ratio composites where the 1:1 and 1.33:1 ratio sensor composites are able to detect higher pressures limits than the 1.66:1 and 2:1 ratio sensor composites. The 1:1 sensor is able to detect between 3.4063 kPa-51.0938 kPa (50-750 grams) and the 1.33:1 sensor has the same range as its molded equivalence. The reason for the change in detectable range for the 1:1 sensor is that during the printing process there are gaps or spaces that occur between each layer allowing for greater compression needed to compress the graphite particles closer to together to make an initial path for the current to travel across and cause the higher limit detection to travel upwards with the change in initial pressure threshold. Additionally, the conductive particles could be slightly rearranged during the printing fabrication, resulting in gaps or voids within the composite that might cause a break in the current path. This may be investigated in further detail, but for the 1:1 printed sample, an applied voltage of −0.5 V needed to be used, which could signify the presence of the additional voids caused by FFF 3D printing.

Among the molded samples, the higher ratio sensors are able to detect between 0.0170 kPa-20.4375 kPa (0.25-300 grams) where the lower 1.33:1 and 1:1 ratio sensors are able to detect between 0.3406 kPa-20.4375 kPa (5-300 grams), and 2.0438 kPa-47.6875 kPa (30-700 grams). These sensors are able to detect a whole magnitude beneath what a light touch is considered for the human skin, and go over what is required for daily activities by 370%. A light touch is considered to be 100 Pa of pressure on the skin and the pressure required to manipulate objects for daily activities to be 10 kPa.

The testing showed that the lowest composite mixture capable of providing desired piezoresistive properties is a 1:1 ratio of conductive filler material to TPE. The sample with the 0.75:1 mass-to-mass ratio of graphite filler to SEBS proved to be nonconductive under all pressures and applied voltages. Additionally, the only samples that could be FFF 3D printed were the 1:1 and 1.33:1 mixtures. Although the 0.75:1 mixture could have been 3D printed, it was not due to its lack of sufficient conduction. Composites with graphite to SEBS ratios of 1.66:1 or 2:1 were not amenable to FFF 3D printing due to the lack of sufficient thermoplastic matrix.

The flexible pressure sensors disclosed herein are capable of achieving values as low as 17.03 Pa and up to 51.09 kPa. These values fully encompass pressures experienced during daily human activities, typically in a range of 100 Pa (e.g., a light touch) to about 10 kPa. In particular, the 3D printed sensors are able to achieve between 340.63 Pa and 51.09 kPa and the molded sensors are able to detect pressure levels between 17.03 Pa and 47.69 kPa. Since the molded sensors can have a higher ratio of conductive material to polymer matrix, they are able to have a greater sensitivity to changes in pressure, whereas the 3D printed sensors need to have a greater ratio of polymer matrix to conductive material in order to be amenable to FFF 3D printing. In certain embodiments, sensors incorporating molded piezoresistive elements can be molded in 3D printed molds to create custom and precise pressure sensors for prosthetics or other medical devices.

Within the 3D printed samples, there are only slight changes from the detectable levels for the composites that are 3D printable. For the 3D printed samples, only 1:1 and 1.33:1 sensors are able to be 3D printed due to thermal expansion and the large volume fractions of conductive material within the matrix.

The data for the pressure sensors were plotted on $\log_{10}$ graphs as depicted in FIGS. 9-14, with resistance plotted in the lower section and current plotted in the upper section of each figure. The data follows a logarithmic trend with a high $R^2$ value with a power analysis ($R^2 \geq 0.93$ in each instance). At each pressure value shown, certain pressure values are hidden to allow the fitted graph to be more clearly seen. A sample size of N=3 was used to show the variation in data with the same pressure applied.

Figure 15:
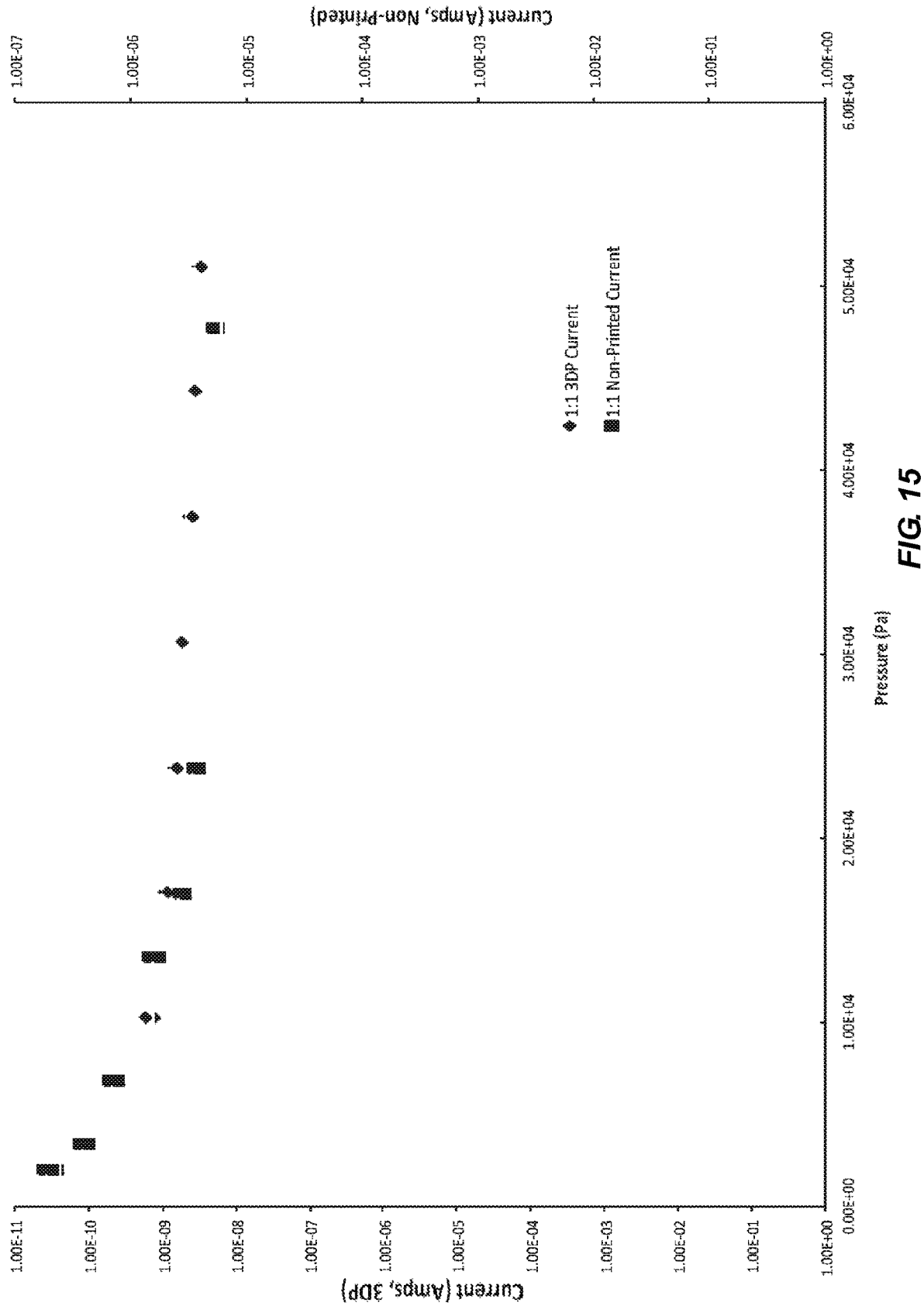
FIG. 15 includes $\log_{10}$ plots of current as a function of pressure (Pa) for two flexible sensors incorporating piezoresistive elements including a piezoresistive composite material having a 1:1 conductive filler material to elastomer (TPE) ratio, including one flexible sensor produced by 3D printing according to a fused filament fabrication process and another flexible sensor produced by a molding process.
Figure 16:
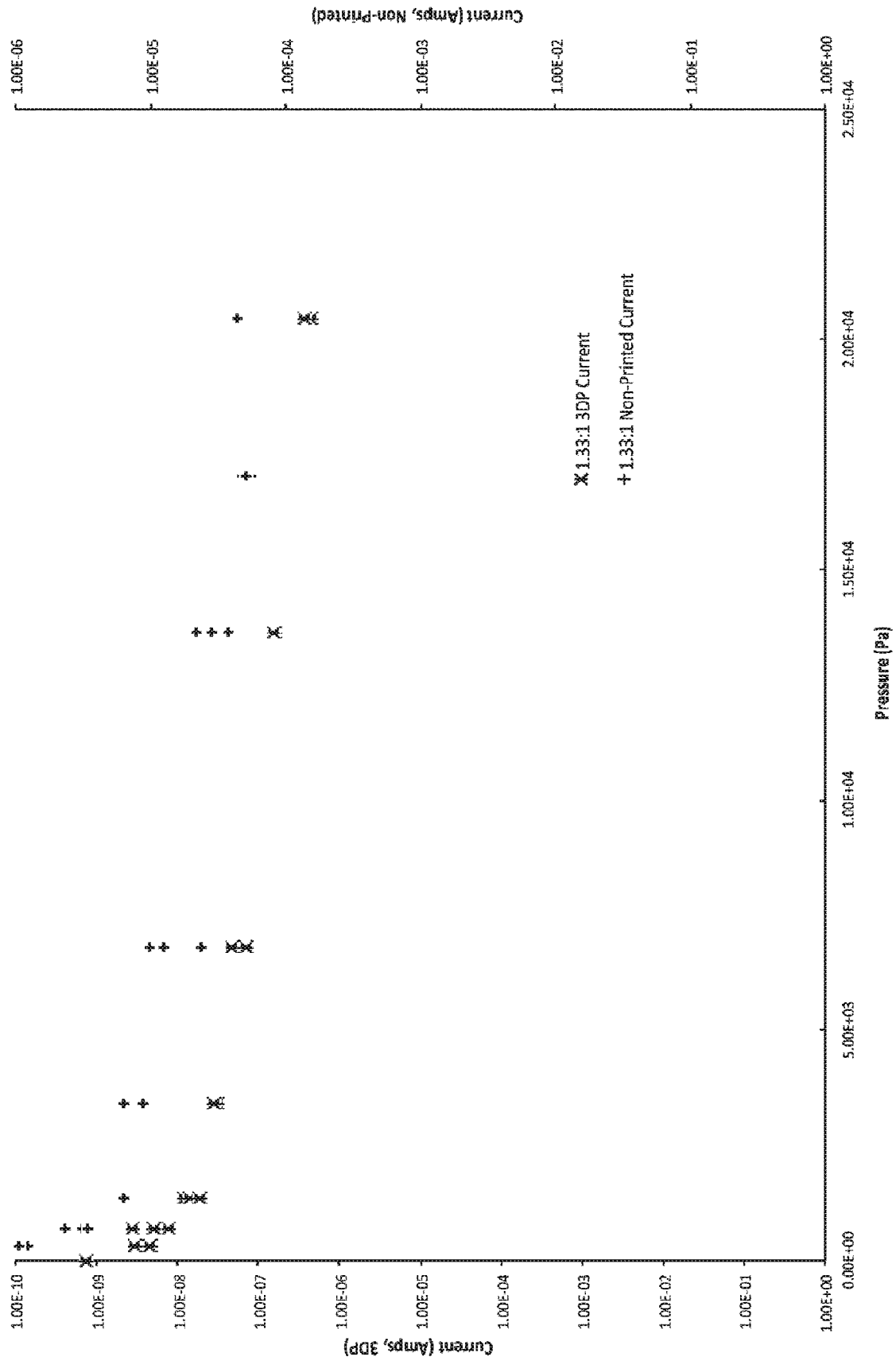
FIG. 16 includes $\log_{10}$ plots of current as a function of pressure (Pa) for two flexible sensors incorporating piezoresistive elements including a piezoresistive composite material having a 1.33:1 conductive filler material to elastomer (TPE) ratio, including one flexible sensor produced by 3D printing according to a fused filament fabrication process and another flexible sensor produced by a molding process.

FIGS. 15 and 16 each include $\log_{10}$ plots of current as a function of pressure (Pa) for two flexible sensors incorporating piezoresistive elements including a piezoresistive composite material, including one flexible sensor produced by 3D printing according to a fused filament fabrication process and another flexible sensor produced by a molding process. In FIG. 15, the piezoresistive composite material has a 1:1 conductive filler material to elastomer (TPE) ratio, whereas in FIG. 16, the piezoresistive composite material has a 1.33:1 conductive filler material to elastomer (TPE) ratio. As shown in FIGS. 15 and 16, when the 1:1 and 1.33:1 3D printed flexible piezoresistive sensors are compared to their molded equivalents, the samples follow similar trends (e.g., curve shapes) differing only in their output current value. In particular, the 3D printed samples operate on an outputted current value about four magnitudes lower than the molded samples.

Figure 34:
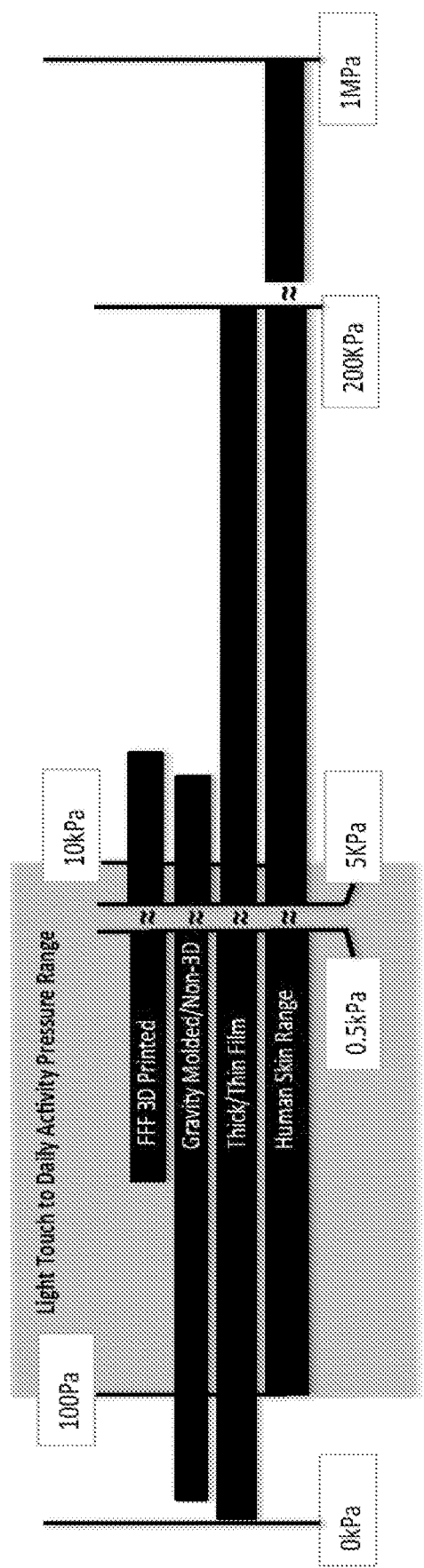
FIG. 34 is a horizontal bar diagram showing human skin detection limits and sensor ranges for three types of sensors, namely: flexible sensors including piezoresistive composite material produced by 3D printing according to a fused filament fabrication process, flexible sensors including piezoresistive composite material produced by a molding process, and thick/thin film sensors.

In certain embodiments, the flexible sensors incorporating piezoeresistive composite materials presented herein can be used as pressure sensors for daily activities and can be used to detect levels just above a light touch. FIG. 34 is a horizontal bar diagram showing human skin detection limits and sensor ranges for three types of sensors, namely: flexible sensors piezoresistive composite material produced by 3D printing according to a fused filament fabrication process, and flexible sensors piezoresistive composite material produced by a molding process. Since the 1:1 or 1.33:1 3D printed sensors can detect between 3.4063 kPa-51.0938 kPa (50-750 grams) and 0.3406 kPa-20.4375 kPa (5-300 grams), and daily activities (DA) and a light touch operate in the 10 kPa and 100 Pa range, the sensors presented here can be used in conjunction with one another to create a dual or zone sensor that can operate for DAs and light pressures. This allows for low cost, simple fabrication of low-level detection pressure sensors that can be customized to the needs and wants of the user.

In certain embodiments, a flexible pressure sensor incorporating a single piezoresistive composite material as disclosed herein may be incorporated in a prosthetic or medical device and designed to accommodate sensor feedback needed for meeting the demands of routine human (e.g., daily) activities. In other embodiments, multiple flexible pressure sensors incorporating different piezoresistive composite materials having different operative pressure ranges may be utilized together in a prosthetic or medical device as part of a two-part or multi-part feedback system suitable to meet the demands of routine human activities.

3D printed sensors also have the ability to be embedded within a 3D printed part to allow for complex devices to be manufactured or to create pressure sensors with unique geometries to be placed in locations where it is currently difficult or impossible to place a current or academic research sensor. Being able to 3D print a fully functioning sensor without the need for additional manufacturing, or even only being able to create a 3D printed housing for a sensor, will open up opportunities for new and intelligent 3D printed devices to be fabricated.

Additionally, molded sensors can to be formed into any 3D printed mold to create unique geometries and ideal pressure sensor designs. These molded sensors will not have the same flexibility and ideal fabrication techniques as fully 3D printed sensors, but they can be low cost, effective pressure sensors that can detect pressure values all the way down to 17 Pa, well below the pressure value for a light touch. Detecting values well below the light touch threshold will allow prosthetics to be able to detect the early onset of contact with an object, allowing the prosthetic user to have feedback before a person without a prosthetic could.

Although the preceding discussion has focused primarily on flexible sensors incorporating piezoresistive materials, it is to be appreciated that flexible sensors incorporating piezoresistive materials may be utilized as shear sensors or proprioceptors in certain embodiments.

Figure 19:
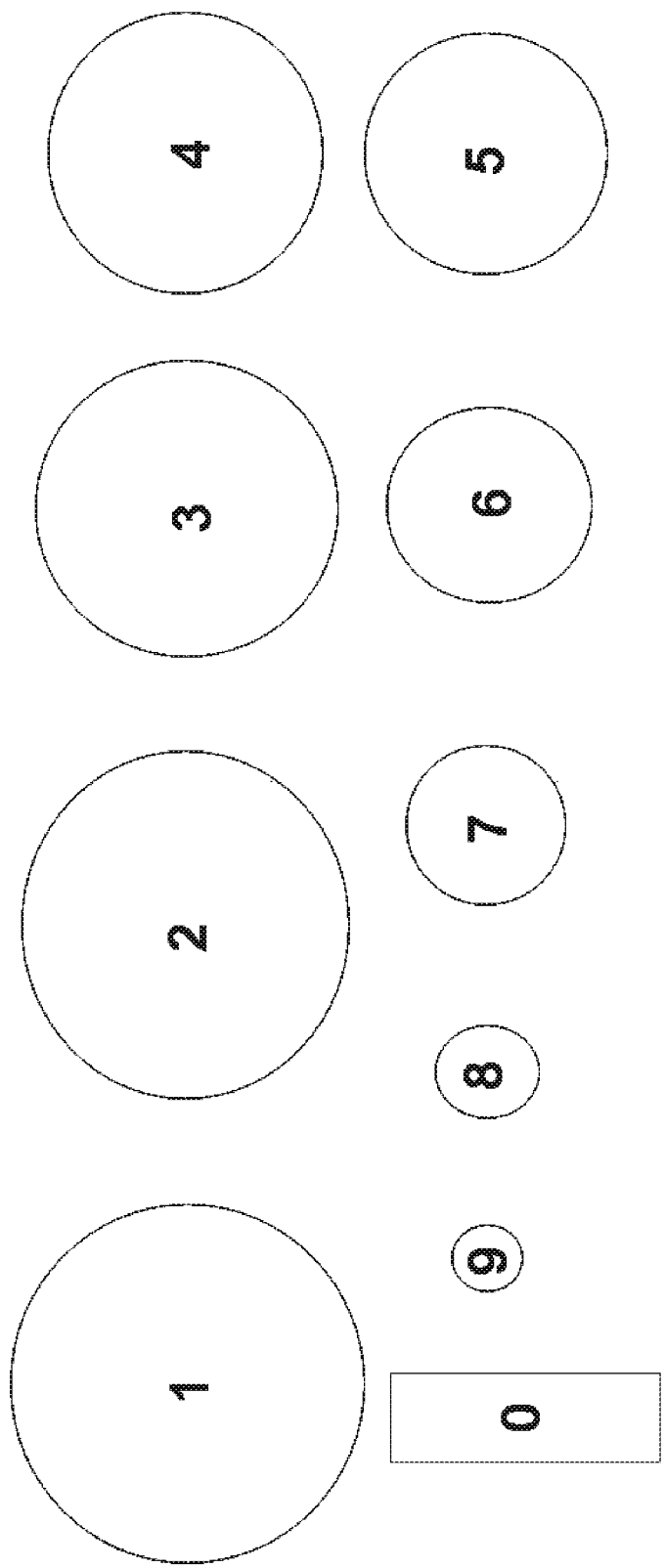
FIG. 19 is a schematic representation of a proprioceptor test device including different diameter rods (numbers 1 to 9) about which a flexible piezoresistive sensor (number 0) may be wrapped and the output current recorded.

FIG. 19 is a schematic representation of a proprioceptor test device including different diameter rods (numbers 1 to 9) about which a flexible piezoresistive sensor (number 0) may be wrapped and the output current recorded. The flexible piezoresistive sensor includes a flexible piezoresistive element arranged between first and second electrodes.

Figure 20:
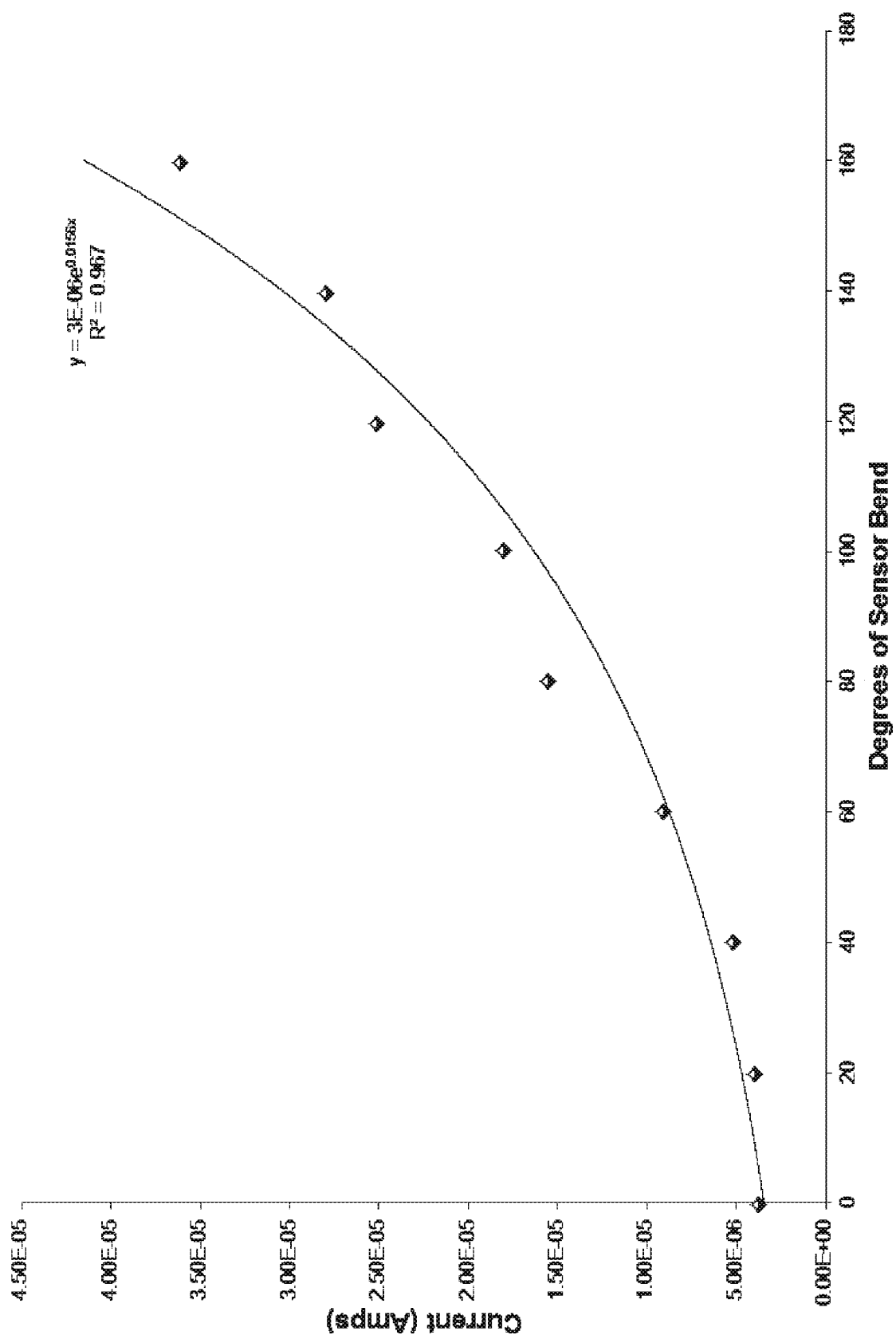
FIG. 20 is a plot of current (Amps) versus degrees of sensor bend obtained with a flexible piezoresistive sensor wrapped around the different diameter rods schematically illustrated in FIG. 19.

FIG. 20 is a plot of current (Amps) versus degrees of sensor bend obtained with a flexible piezoresistive sensor (number 0) wrapped around the different diameter rods schematically illustrated in FIG. 19. FIG. 20 depicts the degree of sensor bend or flexion as a result of output current of a molded proprioceptor sensor with a constant applied voltage. Results show an upward power trend as the bend angle increases from 0 to 180 degrees due to the decrease in sensor thickness during flexion. The sensor design was a rectangle with dimensions of 12 mm×2.54 mm×2.54 mm.

Figure 21A:
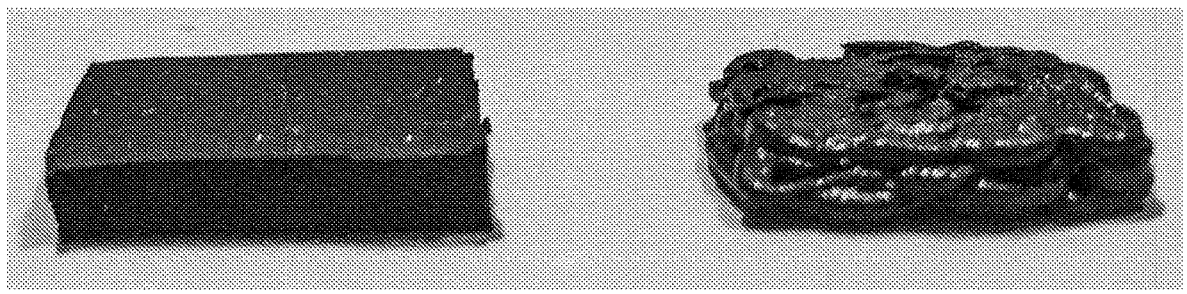
FIG. 21A is a photograph showing a first piezoresistive composite material formed by molding (at left) and a second piezoresistive composite material formed by 3D printing (at right).
Figure 21B:
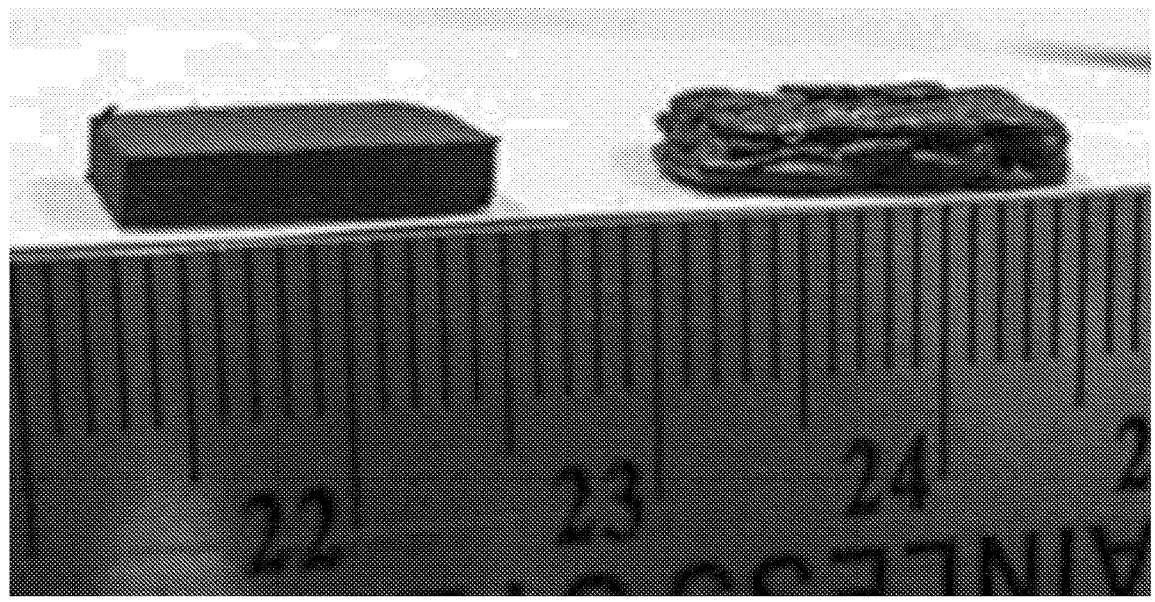
FIG. 21B is a photograph showing the first piezoresistive composite material and the second piezoresistive composite material of FIG. 21A, arranged proximate to a centimeter scale.
Figure 22A:
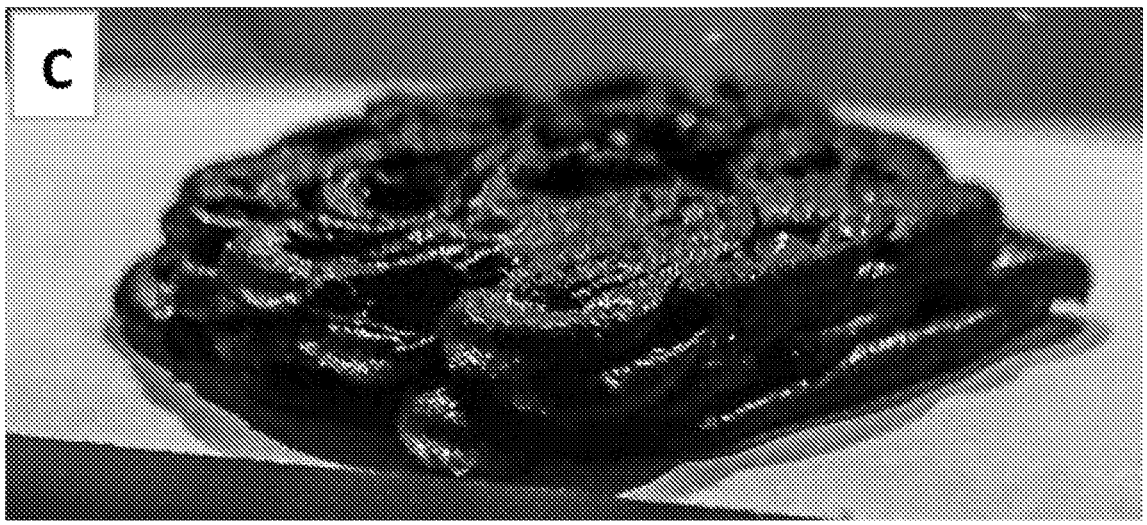
FIG. 22A is a perspective view of the 3D printed second piezoresistive composite material of FIGS. 21A and 21B.
Figure 22B:
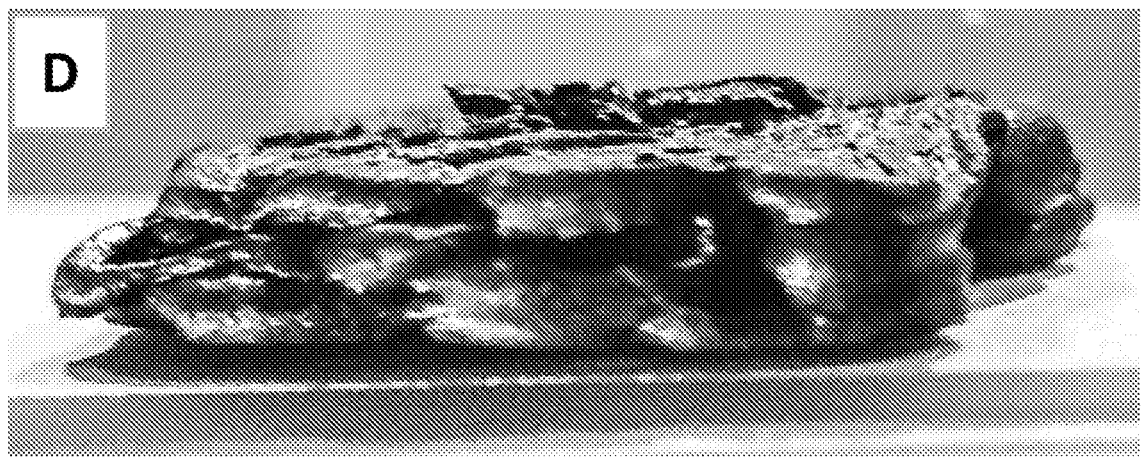
FIG. 22B is a side elevation view of the 3D printed second piezoresistive composite material of FIGS. 21A-22A.
Figure 23A:
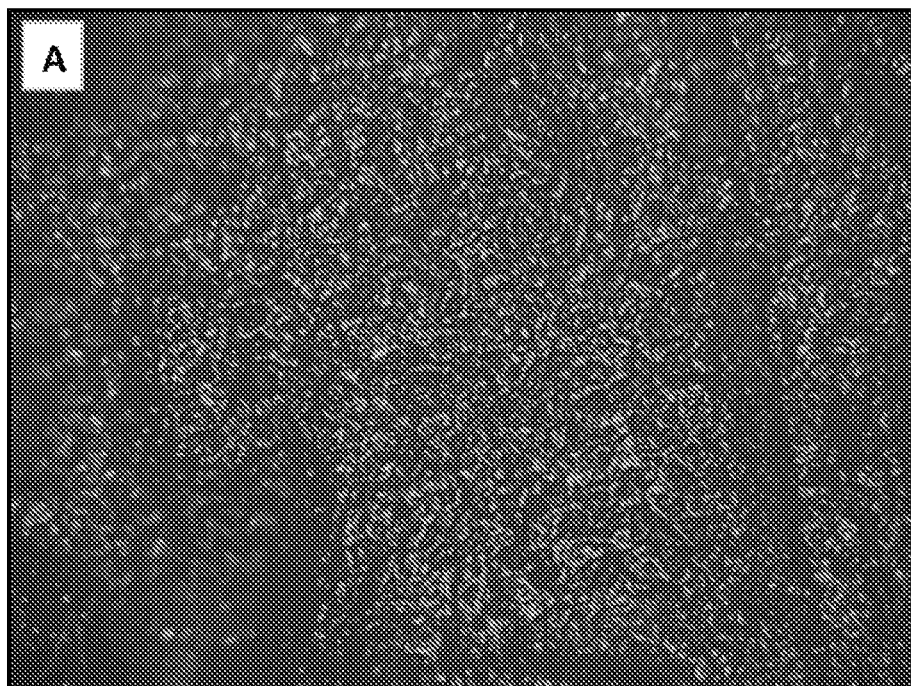
FIG. 23A is a 100× magnification image of the 3D printed second piezoresistive composite material of FIGS. 21A-22B.
Figure 23B:
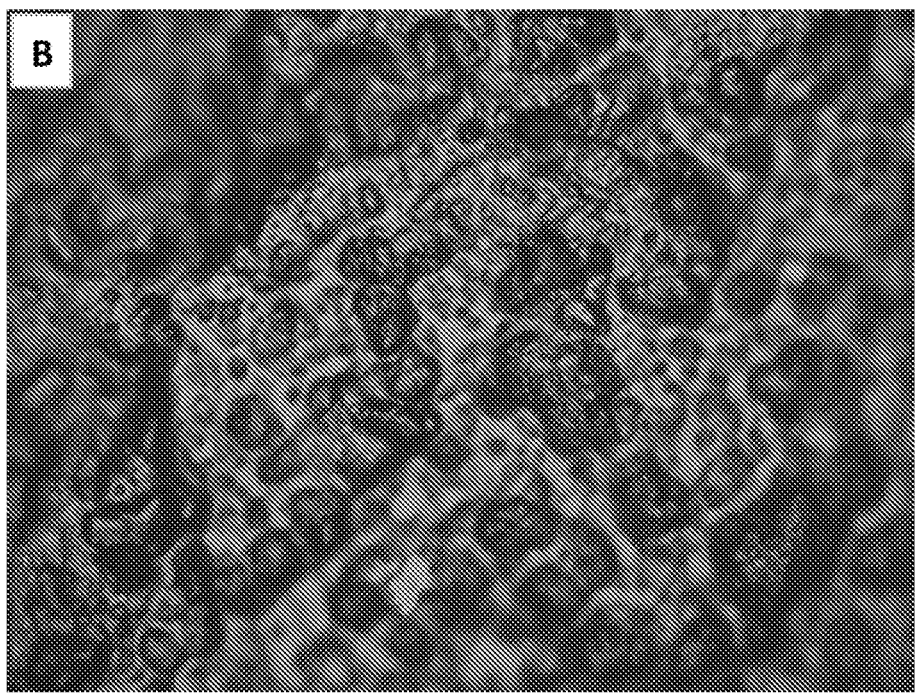
FIG. 23B is a 200× magnification image of the 3D printed second piezoresistive composite material of FIGS. 21A-23A.

FIG. 21A is a photograph showing a first piezoresistive composite material formed by molding (at left) and a second piezoresistive composite material formed by 3D printing (at right). FIG. 21B is a photograph showing the first piezoresistive composite material and the second piezoresistive composite material of FIG. 21A, arranged proximate to a centimeter scale. Each sensor design was rectangular with dimensions of roughly 12 mm×2.54 mm×2.54 mm. FIGS. 22A and 22B provide perspective and side elevation views, respectively, of the 3D printed second piezoresistive composite material of FIGS. 21A and 21B. Additionally, FIGS. 23A and 23B provide 100× and 200× magnification images, respectively, of the 3D printed second piezoresistive composite material of FIGS. 21A-22B.

FIGS. 24 to 29 provide plots of current (amperes) and resistance (Ohms) versus pressure (Pa) for flexible sensors incorporating piezoresistive composite materials of different conductive filler material to elastomer (TPE) ratios.

Figure 24:
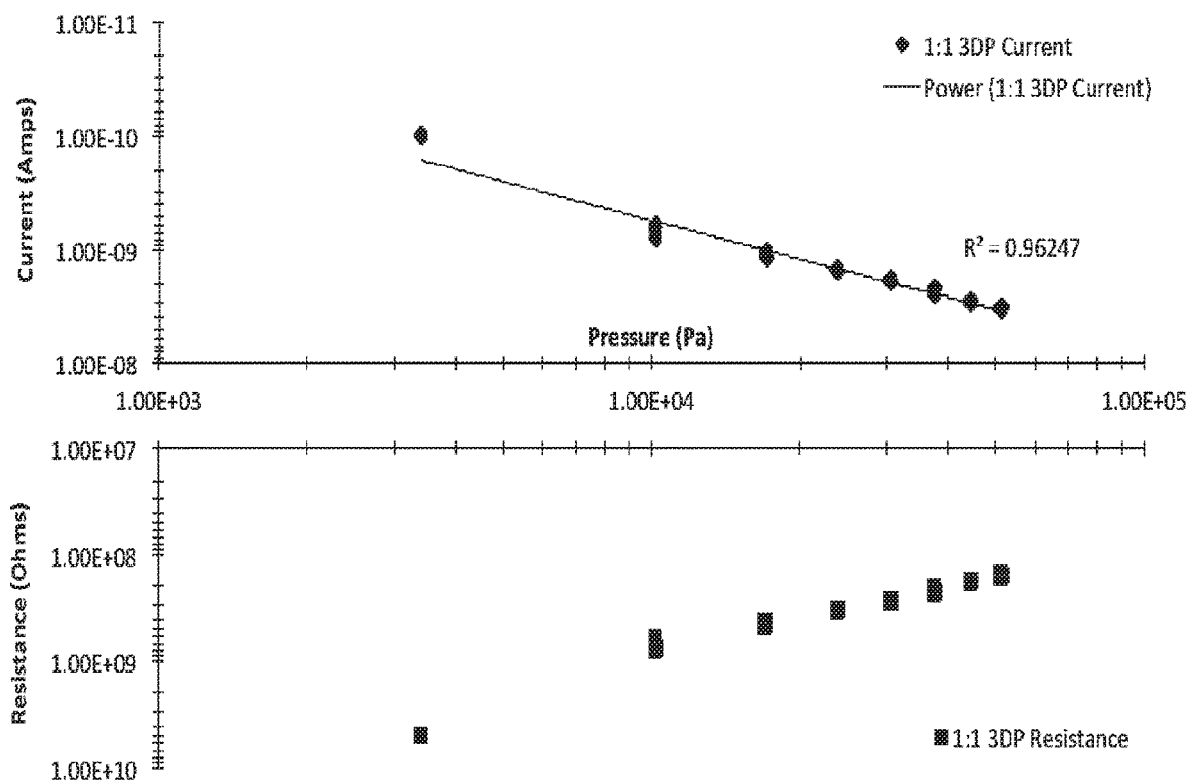
FIG. 24 provides plots of current (amperes) and resistance (ohms) versus pressure (Pa) for a flexible sensor incorporating a piezoresistive composite material having a 1:1 conductive filler material to elastomer (TPE) ratio, and produced by 3D printing according to a fused filament fabrication process.
Figure 25:
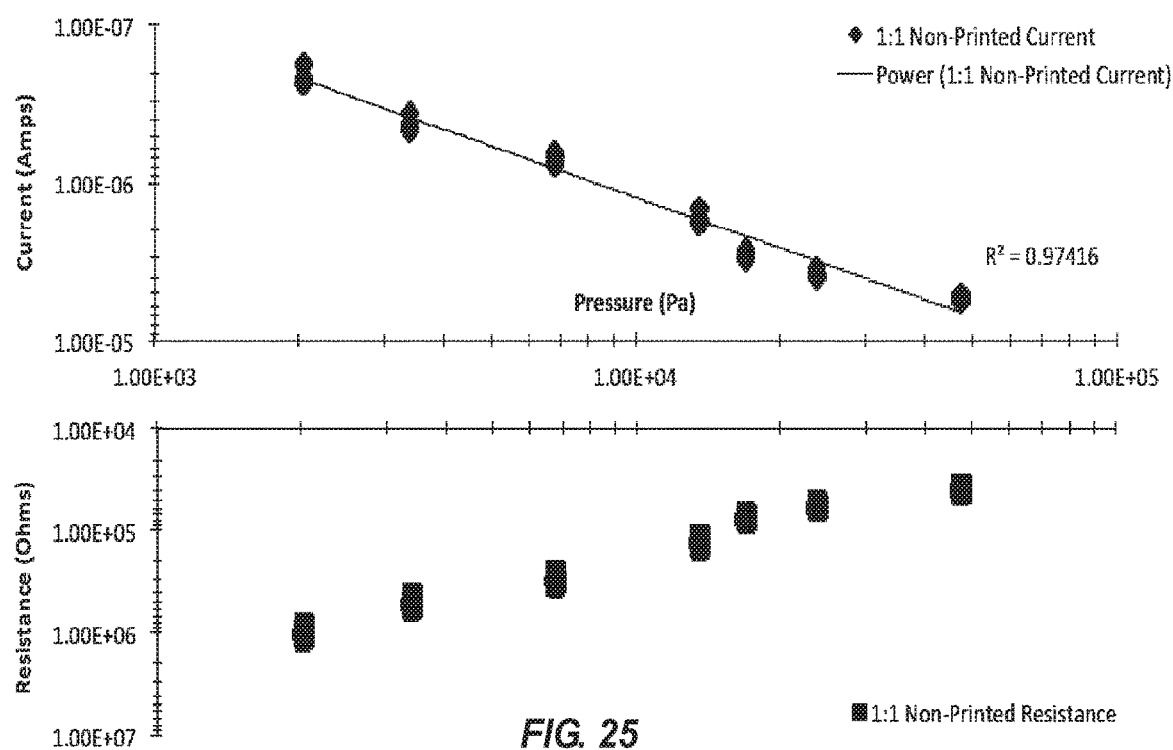
FIG. 25 provides plots of current (amperes) and resistance (ohms) versus pressure (Pa) for a flexible sensor incorporating a piezoresistive composite material having a 1:1 conductive filler material to elastomer (TPE) ratio, and produced by molding (i.e., a non-printing process).

FIG. 24 provides plots of current and resistance versus pressure for a flexible sensor incorporating a piezoresistive composite material having a 1:1 conductive filler material to elastomer (TPE) ratio, and produced by 3D printing according to a fused filament fabrication process. FIG. 25 provides plots of current and resistance versus pressure for a flexible sensor incorporating a piezoresistive composite material having a 1:1 conductive filler material to elastomer (TPE) ratio, and produced by molding (i.e., a non-printing process). As shown in FIGS. 24 and 25, the sensors produced by FFF 3D and molding processes perform similarly.

Figure 26:
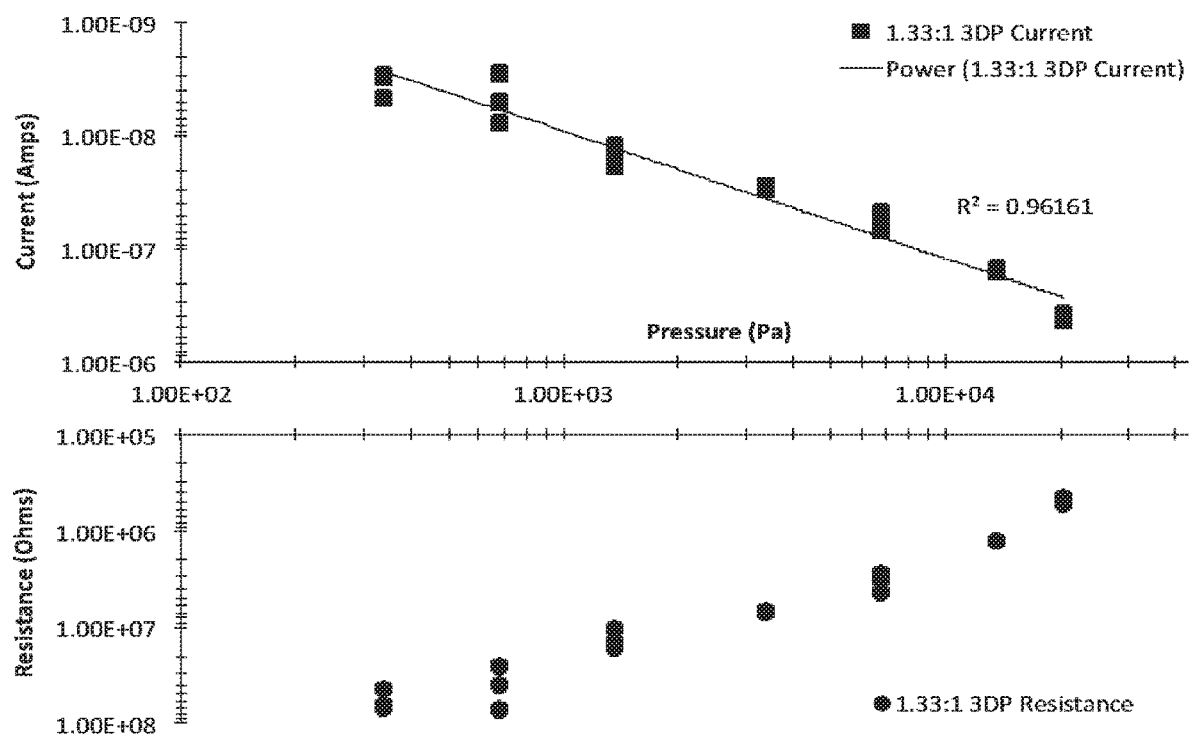
FIG. 26 provides plots of current (amperes) and resistance (ohms) versus pressure (Pa) for a flexible sensor incorporating a piezoresistive composite material having a 1.33:1 conductive filler material to elastomer (TPE) ratio, and produced by 3D printing according to a fused filament fabrication process.
Figure 27:
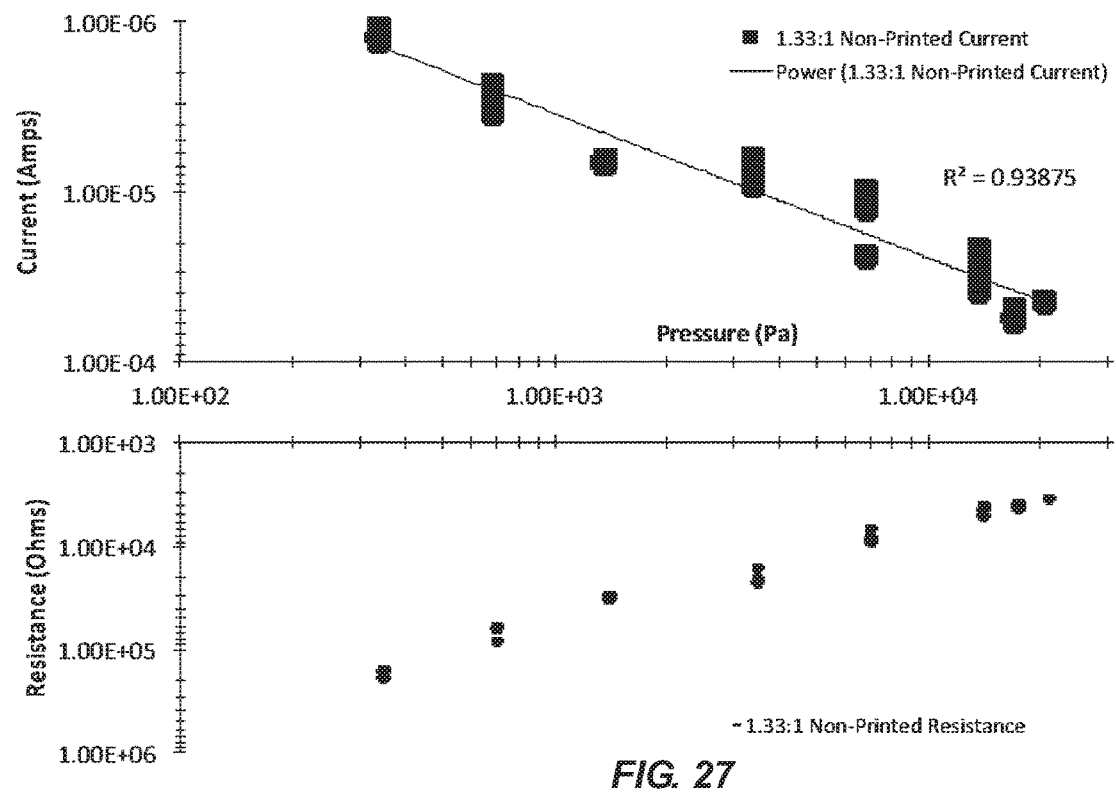
FIG. 27 provides plots of current (amperes) and resistance (ohms) versus pressure (Pa) for a flexible sensor incorporating a piezoresistive composite material having a 1.33:1 conductive filler material to elastomer (TPE) ratio, and produced by molding.

FIG. 26 provides plots of current and resistance versus pressure for a flexible sensor incorporating a piezoresistive composite material having a 1.33:1 conductive filler material to elastomer (TPE) ratio, and produced by 3D printing according to a fused filament fabrication process. FIG. 27 provides plots of current and resistance versus pressure for a flexible sensor incorporating a piezoresistive composite material having a 1.33:1 conductive filler material to elastomer (TPE) ratio, and produced by molding. As shown in FIGS. 26 and 27, the sensors produced by FFF 3D and molding processes perform similarly.

Figure 28:
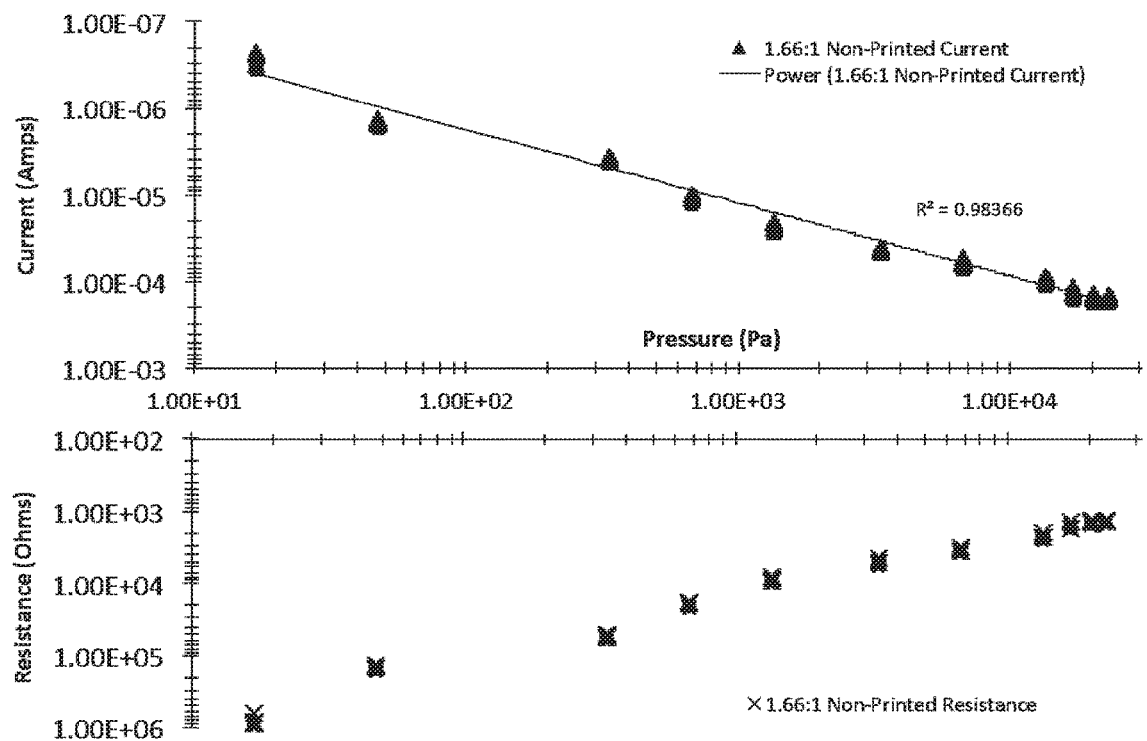
FIG. 28 provides plots of current (amperes) and resistance (ohms) versus pressure (Pa) for a flexible sensor incorporating a piezoresistive composite material having a 1.66:1 conductive filler material to elastomer (TPE) ratio, and produced by molding.
Figure 29:
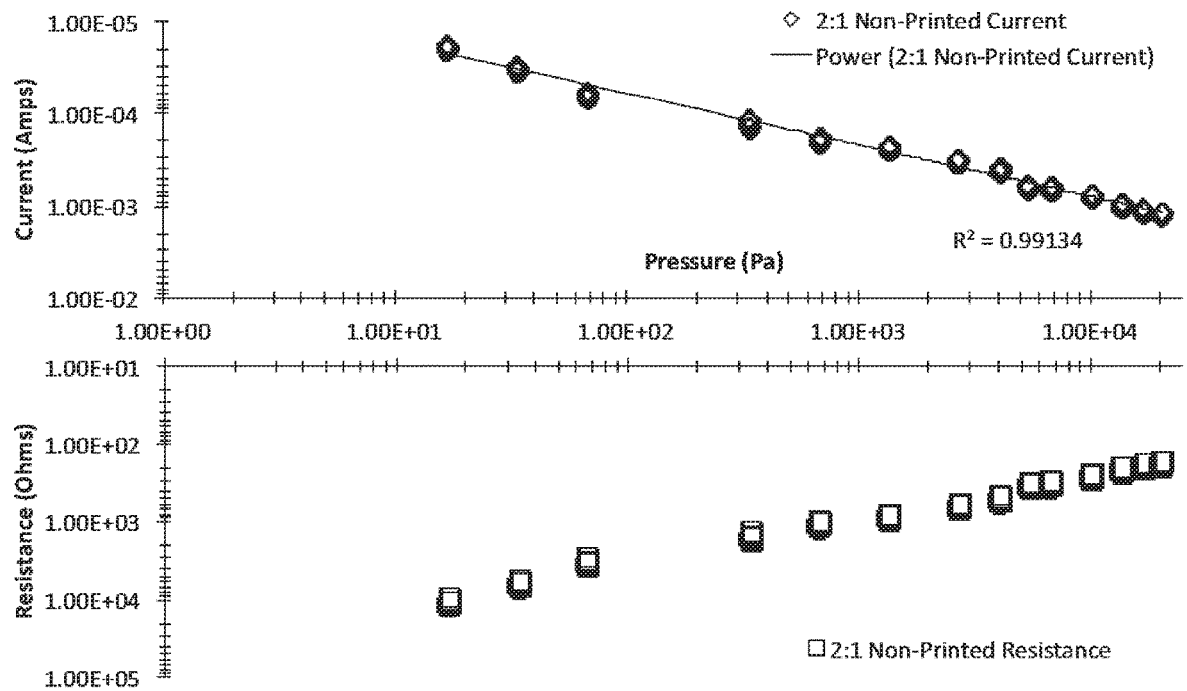
FIG. 29 provides plots of current (amperes) and resistance (ohms) versus pressure (Pa) for a flexible sensor incorporating a piezoresistive composite material having a 2:1 conductive filler material to elastomer (TPE) ratio, and produced by molding.

FIG. 28 provides plots of current and resistance versus pressure for a flexible sensor incorporating a piezoresistive composite material having a 1.66:1 conductive filler material to elastomer (TPE) ratio, and produced by molding. FIG. 29 plots of provides current and resistance versus pressure for a flexible sensor incorporating a piezoresistive composite material having a 2:1 conductive filler material to elastomer (TPE) ratio, and produced by molding. Current and resistance values follow similar trendlines despite the change in conductive filler material to elastomer (TPE) ratio.

Figure 30:
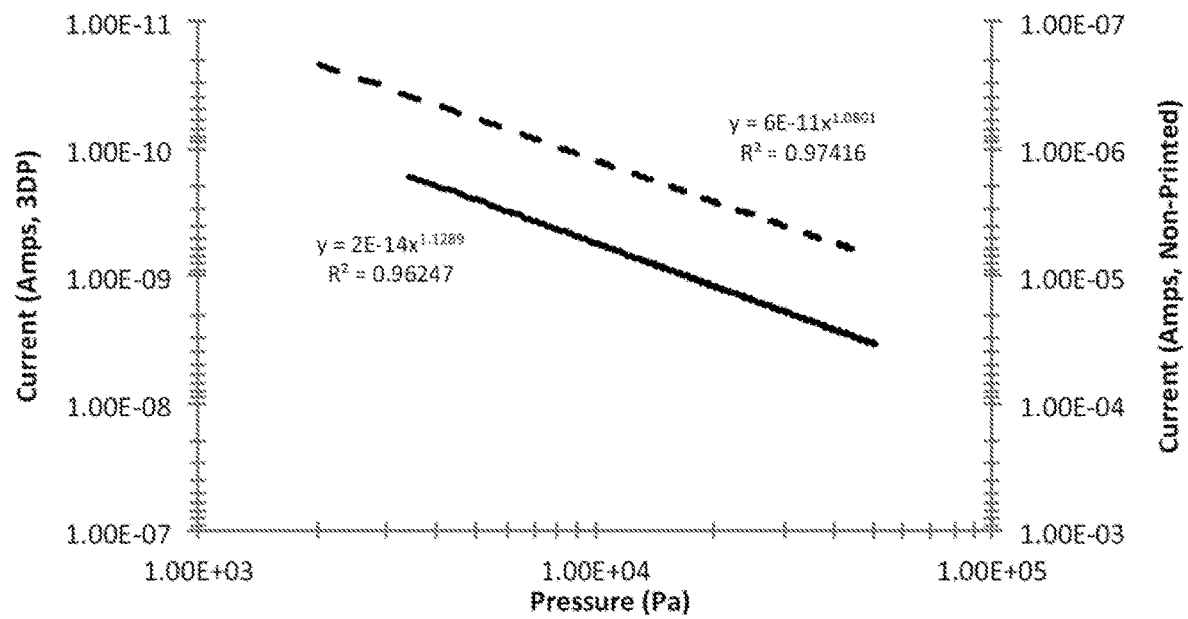
FIG. 30 provides plots of fitted lines for current (amperes) versus pressure (Pa) for a first flexible sensor produced by 3D printing according to a fused filament fabrication process and a first flexible sensor produced by a molding process, with each sensor incorporating a piezoresistive composite material having a 1:1 conductive filler material to elastomer (TPE) ratio.
Figure 31:
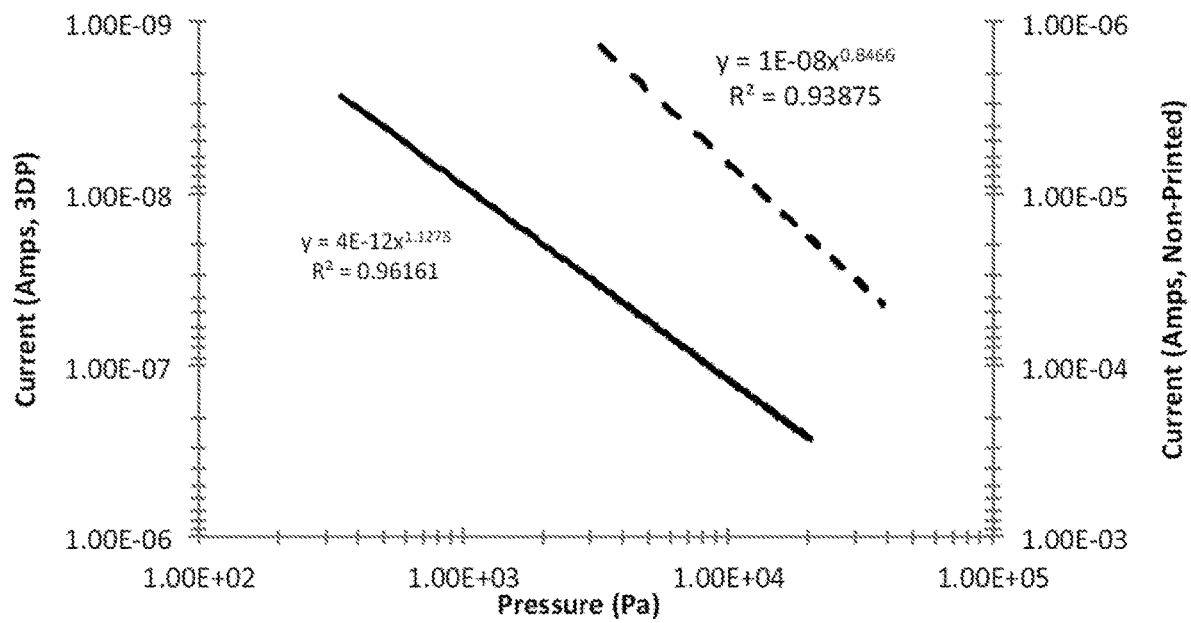
FIG. 31 provides plots of fitted lines for current (amperes) versus pressure (Pa) for a second flexible sensor produced by 3D printing according to a fused filament fabrication process and a second flexible sensor produced by a molding process, with each sensor incorporating a piezoresistive composite material having a 1.33:1 conductive filler material to elastomer (TPE) ratio.

FIG. 30 provides plots of fitted lines for current (amperes) versus pressure (Pa) for a first flexible sensor produced by 3D printing according to a fused filament fabrication process and a first flexible sensor produced by a molding process, with each sensor incorporating a piezoresistive composite material having a 1:1 conductive filler material to elastomer (TPE) ratio. Similarly, FIG. 31 provides plots of fitted lines for current (amperes) versus pressure (Pa) for a second flexible sensor produced by 3D printing according to a fused filament fabrication process and a second flexible sensor produced by a molding process, with each sensor incorporating a piezoresistive composite material having a 1.33:1 conductive filler material to elastomer (TPE) ratio. Similar data trends are observed despite the change in conductive filler material to elastomer (TPE) ratio. FFF 3D printed samples have slight changes to their pressure detection ranges due to manufacturing fabrication.

Figure 32A:
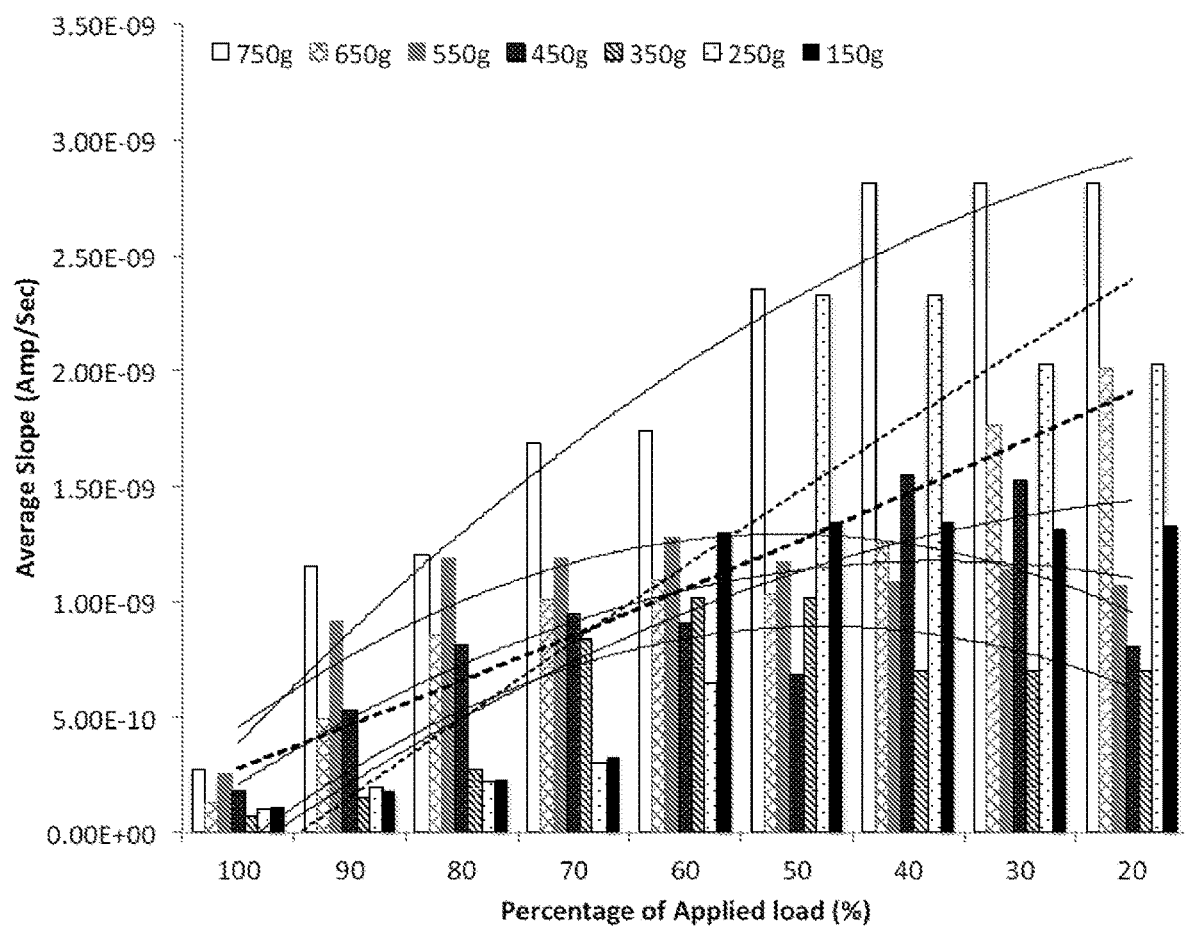
FIG. 32A is a bar chart with superimposed trendlines, providing average slope (amp/sec) versus percentage of applied load for a flexible sensor incorporating a piezoresistive composite material having a 1:1 conductive filler material to elastomer (TPE) ratio, for seven load values ranging from 150 g to 750 g.
Figure 32B:
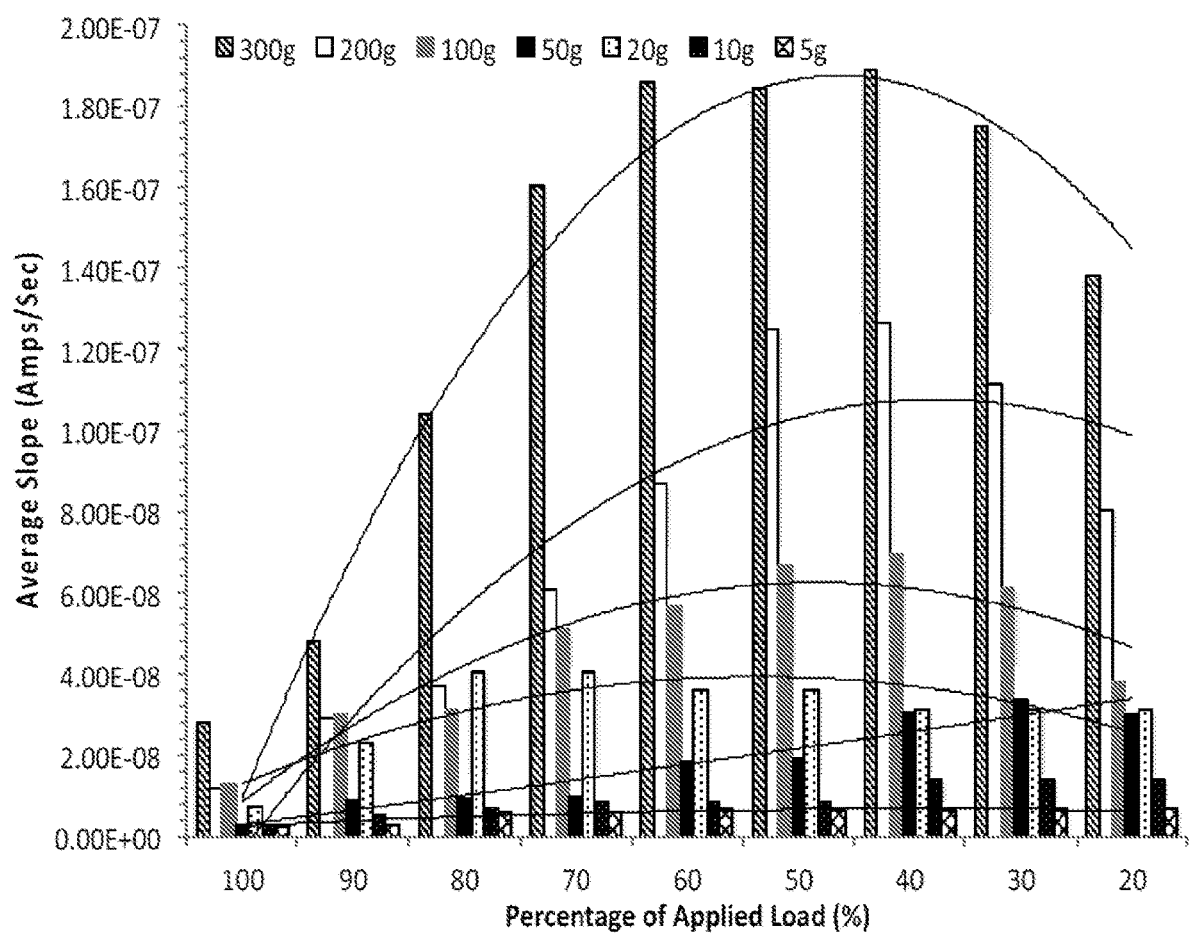
FIG. 32B is a bar chart with superimposed trendlines, providing average slope (amps/sec) versus percentage of applied load for a flexible sensor incorporating a piezoresistive composite material having a 1.33:1 conductive filler material to elastomer (TPE) ratio, for seven load values ranging from 5 g to 300 g.

FIG. 32A is a bar chart with superimposed trendlines, providing average slope (amp/sec) versus percentage of applied load for a flexible sensor incorporating a piezoresistive composite material having a 1:1 conductive filler material to elastomer (TPE) ratio, for seven load values ranging from 150 g to 750 g. FIG. 32B is a bar chart with superimposed trendlines, providing average slope (amp/sec) versus percentage of applied load for a flexible sensor incorporating a piezoresistive composite material having a 1.33:1 conductive filler material to elastomer (TPE) ratio, for seven load values ranging from 5 g to 300 g. As shown, varying the conductive filler material to elastomer (TPE) ratio alters the operating loading or pressure range for a flexible sensor incorporating a piezoresistive composite material.

Figure 33A:
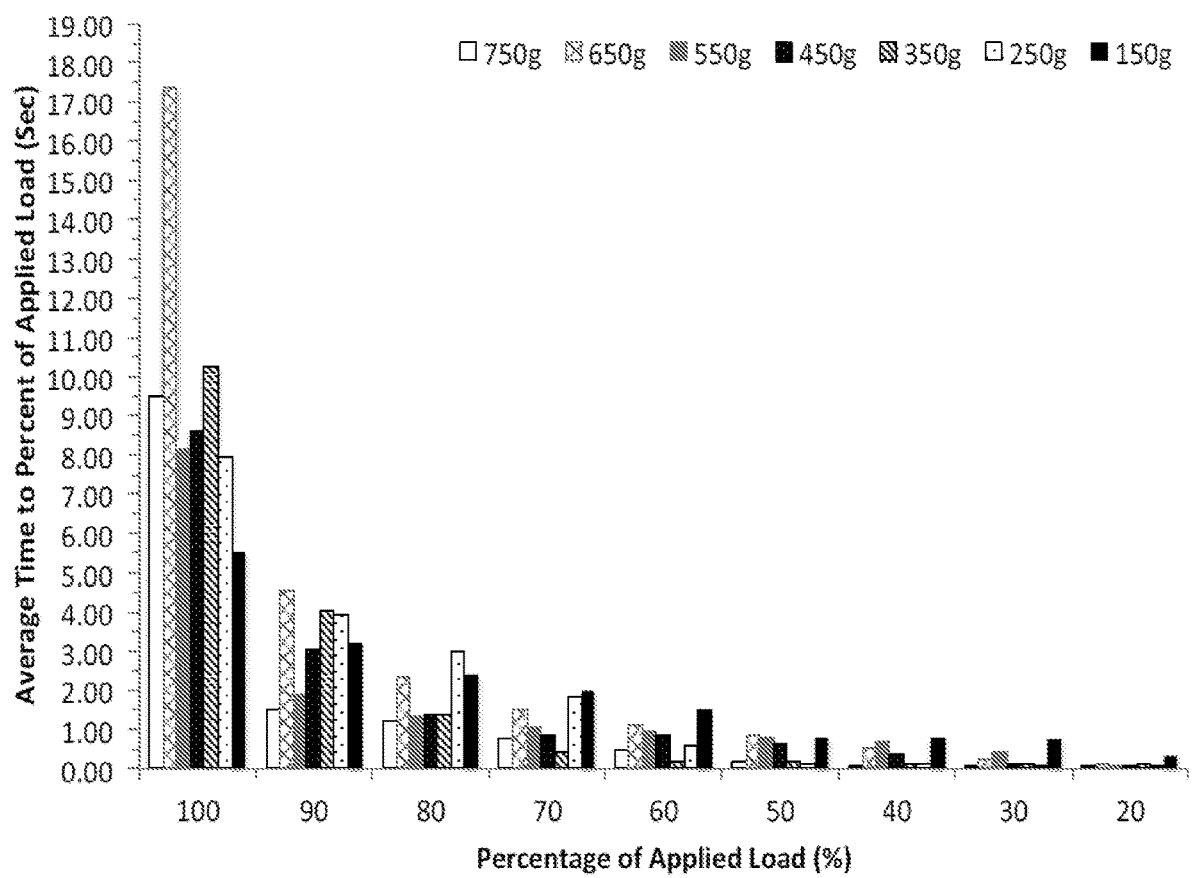
FIG. 33A is a bar chart providing average time to percentage of applied load (seconds) versus percentage of applied load for a flexible sensor incorporating a piezoresistive composite material having a 1:1 conductive filler material to elastomer (TPE) ratio, for seven load values ranging from 150 g to 750 g.
Figure 33B:
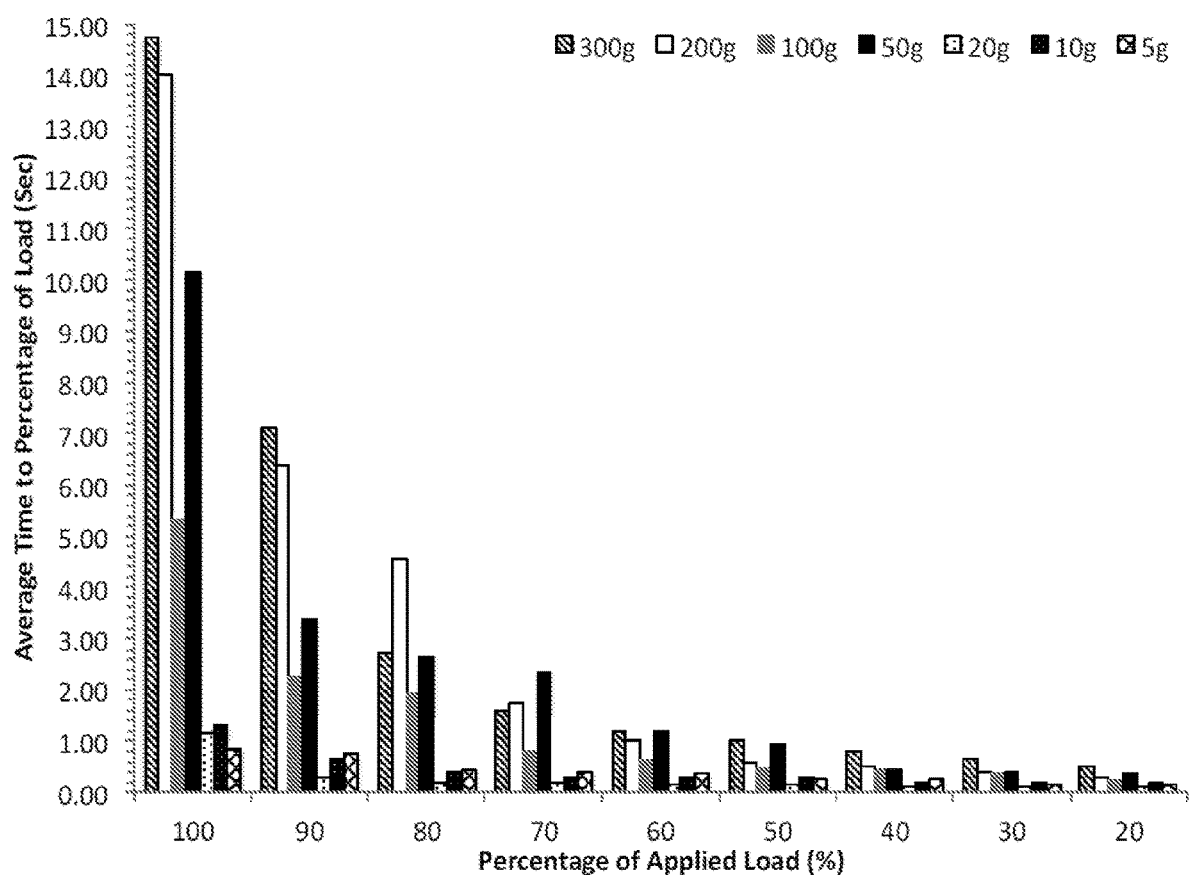
FIG. 33B is a bar chart providing average time to percentage (seconds) versus percentage of applied load for a flexible sensor incorporating a piezoresistive composite material having a 1.33:1 conductive filler material to elastomer (TPE) ratio, for seven load values ranging from 5 g to 300 g.

FIG. 33A is a bar chart providing average time to percentage of applied load (seconds) versus percentage of applied load for a flexible sensor incorporating a piezoresistive composite material having a 1:1 conductive filler material to elastomer (TPE) ratio, for seven load values ranging from 150 g to 750 g. FIG. 33B is a bar chart providing average time to percentage of load (seconds) versus percentage of applied load for a flexible sensor incorporating a piezoresistive composite material having a 1.33:1 conductive filler material to elastomer (TPE) ratio, for seven load values ranging from 5 g to 300 g. Similar trends were observed between FIGS. 33A and 33B.

Disclosed herein are alternatives to the current strain gage and thick/thin film sensors. Flexible sensors incorporating piezoresistive composite materials may be formed by molding or 3D printing and can operate within the daily activity range and within the same magnitude as a light touch on human skin. 3D printed sensors can be printed in one step with no post-processing needed, with an approximate manufacturing cost of $0.125, ignoring equipment and manufacturing overhead. In certain embodiments, a sensor can also be embedded within a 3D printed prosthetic or medical device to create intelligent devices with reduced manufacturing steps. The option for creating embedded electronics will allow for improvements and help grow the area of 3D printing and medical devices. Radiating heat with little nozzle pressure to create a 3D printed part utilizing low elastic modulus composite materials has also been demonstrated.

Flexible piezoresistive sensors disclosed herein represent an improvement upon the current prosthetic pressure sensors that are either strain gage based sensors or thick/thin film based sensors. Flexible piezoresistive sensors disclosed herein have a thickness and feel similar to human skin, may be produced by simple fabrication techniques, and can be manufactured into user-specific geometries. When produced by FFF 3D printing, a flexible piezoresistive sensor can be easily printed into smaller or larger sizes to create custom layouts or patterns for pressure sensor feedback systems.

Upon reading the foregoing description in light of the accompanying drawing figures, those skilled in the art will understand the concepts of the disclosure and will recognize applications of these concepts not particularly addressed herein. Those skilled in the art will recognize improvements and modifications to the preferred embodiments of the present disclosure. All such improvements and modifications are considered within the scope of the concepts disclosed herein and the claims that follow.

What is claimed is:

1. A flexible sensor comprising:
    a first electrode and a second electrode; and
    a piezoresistive element comprising piezoresistive composite material arranged between the first electrode and the second electrode, wherein the piezoresistive composite material comprises a thermoplastic elastomer (TPE) and a conductive filler material, and the piezoresistive composite material comprises an elastic modulus value of less than about $1\times10^{-3}$ GPa;
    wherein the piezoresistive element comprises a unitary fused body structure fabricated by a fused filament fabrication process.

2. The flexible sensor of claim 1, wherein the piezoresistive composite material comprises an elastic modulus value in a range of from $1\times10^{-5}$ to $9.9\times10^{-4}$ GPa.

3. The flexible sensor of claim 1, wherein the flexible sensor exhibits a change in electrical resistance of at least about $1\times10^{2}$ Ohms responsive to a change in pressure of $2\times10^{4}$ Pa applied to the piezoresistive composite material.

4. The flexible sensor of claim 1, wherein the TPE comprises polystyrene ethylene butylene styrene (SEBS).

5. The flexible sensor of claim 1, wherein the conductive filler material comprises carbon.

6. The flexible sensor of claim 5, wherein the conductive filler material comprises at least one of graphite, carbon black, graphene, or diamond.

7. The flexible sensor of claim 1, wherein the conductive filler material comprises an electrically conductive polymer having a higher melting temperature than the TPE.

8. The flexible sensor of claim 1, wherein the conductive filler material is dispersed in the TPE.

9. The flexible sensor of claim 1, wherein at least one of the first electrode or the second electrode comprises a foil, a mesh, a grid, or a wire.

10. The flexible sensor of claim 1, comprising a thickness in a range of from about 1 mm to about 3 mm.

11. The flexible sensor of claim 1, embodied in a pressure sensor, a proprioceptor, or a shear sensor.

12. A prosthetic device or a medical device comprising the flexible sensor of claim 1.

13. A method of fabricating a flexible sensor according to claim 1, the method comprising:

forming a mixture of thermoplastic elastomer (TPE) and conductive filler material;

heating the mixture of TPE and conductive filler material to a flowable state; and depositing the heated mixture in sequential layers by a fused filament fabrication process to form the piezoresistive element.

14. The method of claim 13, wherein the mixture of TPE and conductive filler material is formed into a rod-like structure having a first width or diameter, and the fused filament fabrication process comprises passing the rod-like structure through a heated structure including a discharge nozzle comprising a second width or diameter, wherein the first width or diameter is less than about 15% larger than the second width or diameter.

15. The method of claim 13, further comprising forming at least one of the first electrode or the second electrode via three-dimensional printing.

* * * * *